US012633783B2

(12) United States Patent
Hurwitz et al.

(10) Patent No.: US 12,633,783 B2
(45) Date of Patent: May 19, 2026

(54) SELF-ALIGNMENT FOR WIRELESS CHARGING

(71) Applicant: Google LLC, Mountain View, CA (US)

(72) Inventors: Jonathan D. Hurwitz, Cupertino, CA (US); Christina L. Gilbert, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 754 days.

(21) Appl. No.: 17/990,624

(22) Filed: Nov. 18, 2022

(65) Prior Publication Data

US 2023/0077596 A1 Mar. 16, 2023

Related U.S. Application Data

(63) Continuation of application No. PCT/US2020/034039, filed on May 21, 2020.

(51) Int. Cl.
H02J 50/90 (2016.01)
H01F 7/20 (2006.01)
(Continued)

(52) U.S. Cl.
CPC ................ H02J 50/90 (2016.02); H01F 7/20 (2013.01); H02J 50/005 (2020.01); H02J 50/10 (2016.02);
(Continued)

(58) Field of Classification Search
CPC ....................................................... H02J 50/90
(Continued)

(56) References Cited

U.S. PATENT DOCUMENTS

| | | | |
|---|---|---|---|
| 9,112,363 B2 | 8/2015 | Partovi | |
| 10,651,685 B1 * | 5/2020 | Herbst | .................. H02J 50/402 |

(Continued)

FOREIGN PATENT DOCUMENTS

| | | |
|---|---|---|
| CN | 107848434 | 3/2018 |
| EP | 2564403 | 3/2013 |

(Continued)

OTHER PUBLICATIONS

Office Action in European Appln. No. 20732367.6, mailed on Nov. 12, 2024, 6 pages.

(Continued)

*Primary Examiner* — Ahmed H Omar
(74) *Attorney, Agent, or Firm* — Fish & Richardson P.C.

(57) ABSTRACT

Methods and apparatus are described for self-alignment for wireless charging. In some implementations a method includes detecting a device to be charged by a wireless charger. The wireless charger includes a housing and a wireless power transmission coil that is movable within the housing. The method includes determining, by the wireless charger, a direction to move the wireless power transmission coil within the housing to improve alignment of the wireless power transmission coil with a wireless power receiving coil of the device to be charged. The method includes moving, by the wireless charger, the wireless power transmission coil within the housing in the determined direction to align the wireless power transmission coil improve alignment of the wireless power transmission coil with the wireless power receiving coil of the device to be charged.

31 Claims, 14 Drawing Sheets

(51) Int. Cl.

| | | |
|---|---|---|
| *H02J 50/00* | (2016.01) | |
| *H02J 50/10* | (2016.01) | |
| *H02J 50/20* | (2016.01) | |
| *H02J 50/40* | (2016.01) | |
| *H02J 50/60* | (2016.01) | |
| *H02J 50/80* | (2016.01) | |

(52) U.S. Cl.
CPC ............ *H02J 50/20* (2016.02); *H02J 50/402* (2020.01); *H02J 50/60* (2016.02); *H02J 50/80* (2016.02)

(58) Field of Classification Search
USPC ......................................................... 320/108
See application file for complete search history.

(56) References Cited

U.S. PATENT DOCUMENTS

| | | | | |
|---|---|---|---|---|
| 2010/0295378 A1* | 11/2010 | Suzuki | .................... | H02J 50/90 |
| | | | | 307/104 |
| 2012/0043931 A1* | 2/2012 | Terao | .................... | B60L 53/124 |
| | | | | 320/108 |
| 2012/0212070 A1* | 8/2012 | Tanabe | .................... | H02J 50/60 |
| | | | | 307/104 |
| 2012/0235636 A1* | 9/2012 | Partovi | ................. | H02J 7/0042 |
| | | | | 320/108 |
| 2013/0281155 A1* | 10/2013 | Ogata | ................... | H02J 50/402 |
| | | | | 455/556.1 |
| 2015/0318709 A1* | 11/2015 | Jol | ........................... | H02J 50/10 |
| | | | | 307/104 |
| 2016/0344224 A1 | 11/2016 | Hong | | |
| 2016/0347193 A1* | 12/2016 | Caldwell | ................. | B60L 53/36 |
| 2018/0248399 A1* | 8/2018 | Moghaddam | ........... | H02J 50/40 |
| 2019/0006893 A1* | 1/2019 | Shaw | ...................... | H02J 50/10 |
| 2019/0238007 A1* | 8/2019 | Bober | ...................... | H02J 7/00 |
| 2020/0203995 A1* | 6/2020 | Osada | ..................... | H02J 50/12 |

FOREIGN PATENT DOCUMENTS

| | | |
|---|---|---|
| EP | 3232536 | 10/2017 |
| KR | 10-2018-0071612 | 6/2018 |
| TW | I 677161 | 11/2019 |
| WO | WO 2011135571 | 11/2011 |
| WO | WO 2012142040 | 10/2012 |
| WO | WO 2015046640 | 4/2015 |
| WO | WO 2017159210 | 9/2017 |
| WO | WO 2018146973 | 8/2018 |

OTHER PUBLICATIONS

International Preliminary Report on Patentability in International Appln. No. PCT/US2020/034039, mailed on Dec. 1, 2022, 14 pages.

International Search Report and Written Opinion in International Appln. No. PCT/US2020/034039, mailed on Mar. 12, 2021, 22 pages.

Invitation to Pay Additional Fees in International Appln. No. PCT/US2020/034039, mailed on Jan. 29, 2021, 13 pages.

* cited by examiner

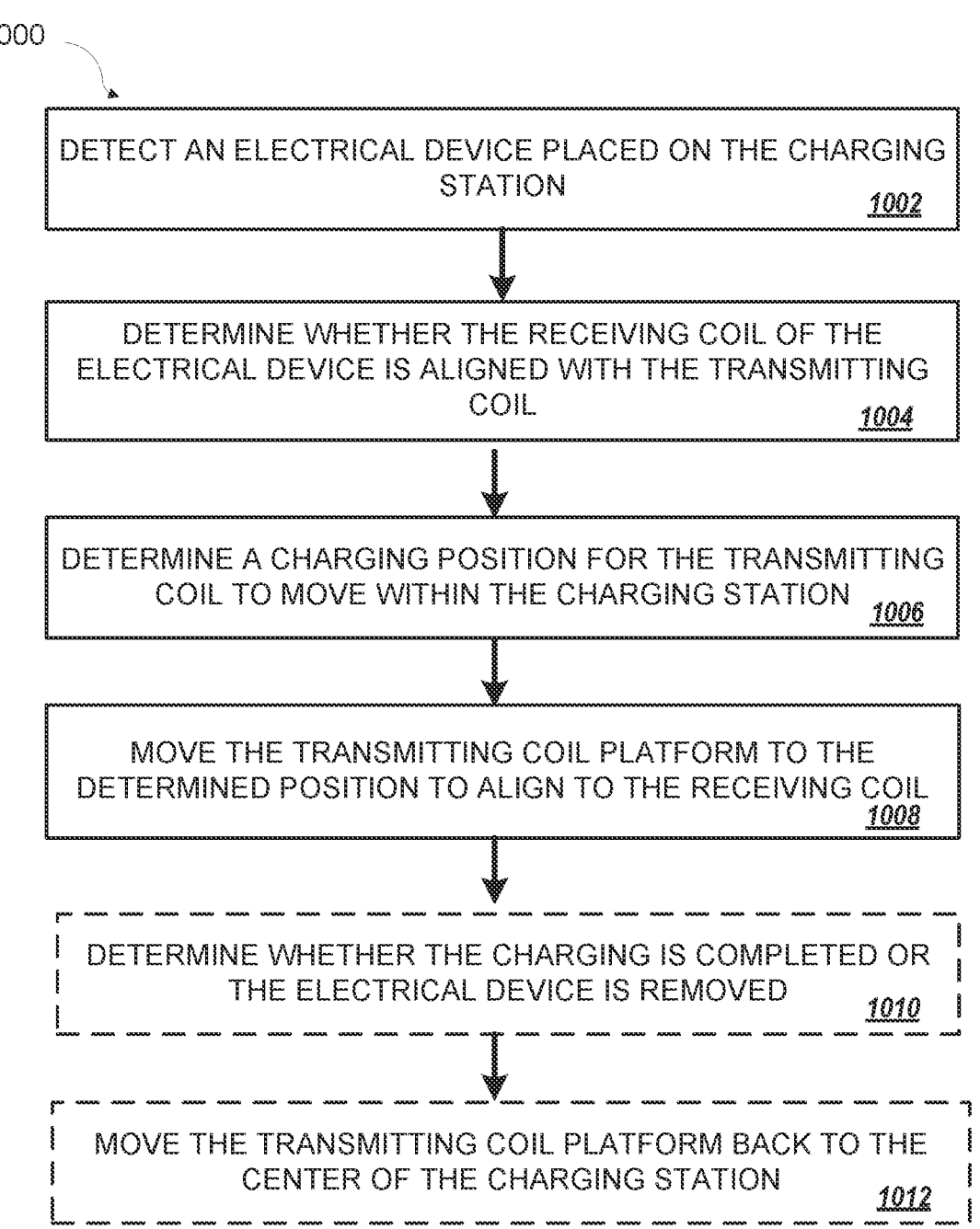

1000

DETECT AN ELECTRICAL DEVICE PLACED ON THE CHARGING STATION 1002

DETERMINE WHETHER THE RECEIVING COIL OF THE ELECTRICAL DEVICE IS ALIGNED WITH THE TRANSMITTING COIL 1004

DETERMINE A CHARGING POSITION FOR THE TRANSMITTING COIL TO MOVE WITHIN THE CHARGING STATION 1006

MOVE THE TRANSMITTING COIL PLATFORM TO THE DETERMINED POSITION TO ALIGN TO THE RECEIVING COIL 1008

DETERMINE WHETHER THE CHARGING IS COMPLETED OR THE ELECTRICAL DEVICE IS REMOVED 1010

MOVE THE TRANSMITTING COIL PLATFORM BACK TO THE CENTER OF THE CHARGING STATION 1012

FIG. 10

SELF-ALIGNMENT FOR WIRELESS CHARGING

CROSS-REFERENCE TO RELATED APPLICATIONS

This application is a continuation application of and claims the benefit of priority to U.S. Application No. PCT/US2020/034039, filed on May 21, 2020, the contents of which are hereby incorporated by reference.

TECHNICAL FIELD

The present specification relates to wireless charging of electrical devices, and in particular wireless charging stations that have self-alignment capabilities.

BACKGROUND

Many mobile devices and other battery-powered devices need to receive energy for general operation and to charge their batteries. Energy can be transferred wirelessly using electromagnetic coupling between a transmitting coil and a receiving coil. In some cases, devices may include a permanent magnet to align the devices with respect to a charging station.

SUMMARY

In some implementations, a wireless charging station includes a moveable transmitting coil platform and a transmitting coil located on the transmitting coil platform. The charging station can include features that enable efficient wireless charging by moving the transmitting coil within the charging station and aligning the transmitting coil with a receiving coil of an electrical device placed on the charging station.

The placement of a device with respect to a wireless charging station has a large effect on the efficiency of energy transfer. Typically, a user is required to align a device to be charged with a charger in order to obtain high efficiency for wireless charging. This can be challenging, especially when the charging station surface is large and placing a device on the surface obscures markings or indicators used for positioning. In some cases, if the device is too far out of alignment with the charger, charging may not occur at all. A user may leave a device on a charger expecting the device to be charging, only to return later and find that charging did not occur.

Various charging stations discussed herein include features to automatically improve alignment between a device and a charging station. When a user places a device on the charging station, the charging station can detect the device and move an internal power transfer coil into alignment with the device to be charged. Rather than require a user to perform precise alignment, the user can simply place the device on a surface of the charging station and the charging station can create the desired alignment through directed movement of an internal assembly comprising a wireless power transmitting coil.

The charging station can include movable internal components that change the position of a wireless power transmitting coil in the charging station. For example, a charging station can include actuators that can move a power transmitting coil. The actuators can be motorized elements, magnets, electromagnets, or other components. The charging station can also include sensors that detect a position of a device to be charged (e.g., optical sensors such as cameras or photodiodes, force or pressure sensors, etc.). Using data from the sensors, the charging station can determine a direction to move the power transmitting coil to improve wireless charging efficiency, or even a specific position as a destination for the power transmitting coil assembly. The wireless charger then uses the actuators to move the power transmitting coil in the determined direction to reach a position with improved alignment. There are many different movement mechanisms and sensor types that can be used to carry out self-alignment by a charging station, a few of which are discussed below. These example charging stations enable movement of a transmitting coil to a charging position in which the axes of the transmitting coil and a receiving coil are aligned, in order to provide effective wireless charging.

One example charging station moves a transmitting coil using a grid of electromagnets. Within the charging station, a grid of electromagnets is arranged to move a transmitting coil platform or assembly. The transmitting coil platform includes a magnet (e.g., a permanent magnet or electromagnet), and the electromagnets in the grid are selectively activated by the charging station to move the transmitting coil platform. For example, the electromagnets can be switched on and off in sequence to move the transmitting coil platform in different directions, due to the magnetic force between the electromagnets and the magnet(s) in the transmitting coil platform. In some implementations, the transmitting coil is configured to move along one axis, along two axes, or omnidirectionally in a plane. The transmitting coil platform may rest on rollers or bearings to facilitate ease of movement.

A second example charging station includes a motor that is configured to move a transmitting coil platform or assembly. In some designs, the motor may be attached to the transmitting coil platform and move with the transmitting coil platform. In some designs, the motor is attached to a housing of the charging station and does not move with the transmitting coil platform. The motor can move the platform using wheels, belts, gears, rollers, or other elements. In some implementations, the transmitting coil is configured to move along one axis, along two axes, or omnidirectionally in a plane.

A third example charging station includes a power transmitting coil that is moveable within the charging station and a magnet (e.g., a permanent magnet) coupled to the power transmitting coil, for example, at the center of the transmitting coil. Devices to be charged can include a permanent magnet with an opposite pole configured to face toward the charging station. This charging station utilizes the magnetic force between this pair of permanent magnets as a driving force to move the transmitting coil horizontally towards the receiving coil of the electrical device. In other words, when the device to be charged is placed on or near the surface of the charging station, the magnet in the device can attract the magnet coupled to the transmitting coil, and the attraction can move the transmitting coil into alignment for wireless charging. As with other implementations, a movable platform or assembly that carries the transmitting coil can be placed on rollers, bearings, wheels, or other elements to reduce friction and facilitate movement.

A fourth example charging station may include a track along which a platform or assembly carrying the transmitting coil can move. The track may be, for example, a two-dimensional grid, a spiral track, or a track of another shape. The charging station can control the movement of the power transmitting coil platform along the track. In some implementations, features of the various examples can be combined. For example, electromagnets can be used to move a power transmitting coil platform along a track. As another example, rollers or bearings can be used to facilitate movement of the power transmitting coil platform along a track.

In a general aspect, a method includes: detecting, by a wireless charger, a device to be charged, wherein the wireless charger comprises a housing and a wireless power transmission coil that is movable within the housing; determining, by the wireless charger, a direction to move the wireless power transmission coil within the housing to improve alignment of the wireless power transmission coil with a wireless power receiving coil of the device to be charged; and moving, by the wireless charger, the wireless power transmission coil within the housing in the determined direction to align the wireless power transmission coil improve alignment of the wireless power transmission coil with the wireless power receiving coil of the device to be charged.

Implementations can include one or more of the following features. For example, in some implementations: the wireless charger comprises an optical sensor; the method comprises receiving, from the optical sensor, data indicating a position of the device to be charged; and determining the direction to move the wireless power transmission coil comprises determining the direction based on the data from the optical sensor.

In some implementations: the wireless charger comprises one or more pressure sensors configured to detect forces on a charging surface of the wireless charger; the method comprises receiving, from the one or more pressure sensors, data indicating one or more forces applied to the charging surface by the device to be charged; and determining the direction to move the wireless power transmission coil comprises determining the direction based on the data indicating the one or more forces applied to the charging surface.

In some implementations: the one or more pressure sensors comprise multiple pressure sensors spaced apart on the wireless charger; the data indicating one or more forces comprise data indicating different forces respectively measured by the multiple pressure sensors; and determining the direction comprises determining the direction based on differences between the different forces.

In some implementations: determining a direction to move the wireless power transmission coil includes: moving the wireless power transmission coil along a predetermined path; determining a measure of wireless coupling strength for a wireless coupling of the power transmission coil and the receiving coil at each of multiple locations along the predetermined path; identifying the measure, from among the determined measures, that indicates the highest wireless coupling strength; and determining the direction as a direction to move toward the location corresponding to the measure identified as indicating the highest wireless coupling strength.

In some implementations, the predetermined path is defined by a search pattern specified in software or firmware of the wireless charger or a mechanical track of the wireless charger.

In some implementations, determining the direction to move the wireless power transmission coil comprises communicating with the device to determine a wireless coupling strength at each of multiple positions of the power transmitting coil.

In some implementations, determining the direction to move the wireless power transmission coil comprises: estimating, by the wireless charger, a position at which the device to be charged is located on a surface of the wireless charger; and determining the direction based on the estimated position.

In some implementations: the device to be charged comprises a camera; the method comprises receiving, from the device to be charged, landmark data indicating a position of one or more landmarks of the wireless charger determined from image data captured by the camera of the device to be charged; and determining the direction to move the wireless power transmission coil comprises determining the direction based on the landmark data from the device to be charged.

In some implementations: the wireless charger comprises multiple antennas configured to communicate with the device to be charged; the method comprises determining a signal strength with which each of the multiple antennas detected a wireless communication from the device to be charged; and determining the direction to move the wireless power transmission coil comprises determining the direction based on differences between signal strengths with which the multiple antennas detected the wireless communication from the device to be charged.

In some implementations, detecting the device to be charged is based on one or more of: using, by the wireless charger, a force sensor of the wireless charger to detect a force applied to the wireless charger by the device to be charged; using, by the wireless charger, an optical sensor of the wireless charger to detect movement of the device or presence of the device; detecting, by the wireless charger, a communication from the device provided over a short-range wireless communication link; or detecting, by the wireless charger, wireless coupling of the wireless power transmission coil with a wireless power receiving coil of the device.

In some implementations: the wireless charger comprises multiple sensors distributed along a charging surface of the wireless charger; and determining the direction to move the wireless power transmission coil comprises determining the direction based on data generated by the multiple sensors.

In some implementations, the multiple sensors are each of a same sensor type that is one of optical sensors, resistive sensors, capacitive sensors, or mechanical sensors.

In some implementations, determining the direction to move the wireless power transmission coil comprises: performing a search along a predetermined search grid comprising multiple positions by moving the wireless power transmission coil within the housing to each of the multiple positions in the search grid and detecting a coupling strength at each of the multiple positions; selecting a position for the wireless power transmission coil based on the detected coupling strengths; and determining the direction to move the wireless power transmission coil toward the selected position.

In some implementations, determining the direction to move the wireless power transmission coil comprises performing an adaptive grid search that includes: moving the wireless power transmission coil within the housing to one or more positions in a search grid until at least a minimum level of coupling between the wireless power transmission coil and the wireless power receiving coil of the device is detected; and in response to detecting at least the minimum level of coupling, moving the wireless power transmission coil through a subset of the search grid in a region that includes the position at which the minimum level of coupling was detected.

In some implementations, the method includes automatically moving the wireless power transmission coil to a predetermined position within the housing in response to at least one of (i) detecting the device to be charged or (ii) terminating charging of the device to be charged.

In some implementations, the predetermined position is a position at a center of a charging surface of the wireless charger.

In some implementations, the method includes performing foreign object detection by requiring verification, by the wireless charger, that the device is appropriate to be charged before supplying power above a threshold level, wherein the verification is based on data communication between the device and the wireless charger.

In some implementations, performing foreign object detection comprises requiring the device to acknowledge that at least a minimum amount of transmitted power is being received by the charged device.

In some implementations, determining the direction to move the wireless power transmission coil comprises: receiving, with each of multiple antenna elements of the wireless charger, a wireless transmission from the device to be charged; determining, using signals from the multiple antenna elements, an angle of incidence of the wireless transmission with respect to the wireless charger; and determining the direction to move the movable assembly and/or a position to locate the movable assembly based on the angle of incidence.

In some implementations, the method includes determining a phase difference between signals generated by the multiple antenna elements based on the wireless transmission, wherein the angle of incidence is determined based on the phase difference.

In some implementations, the radio-frequency wireless transmissions are Bluetooth transmissions, Wi-Fi transmissions, or ultra-wideband transmissions.

In some implementations, the method includes: calculating, by the wireless charger, an angle of incidence for each of multiple incoming radiofrequency communications from the device to be charged; and determining, by the wireless charger, that a position of the device to be charged has stabilized based on the calculated incident angles of transmissions from the device to be charged. Determining the direction to move the movable assembly and/or the position to locate the movable assembly is based on an angle of incidence corresponding to the stabilized position of the device.

Implementations can provide a wireless charger configured for performing methods described herein. Machine-readable storage media may also be provided to store instructions that, when executed by one or more processors of the wireless charger, cause the wireless charger to perform the methods described herein.

In another general aspect, a wireless charger includes: a housing that includes an exterior surface to receive a device to be charged, the housing defining an internal space; a movable assembly configured to move within the internal space of the housing, the movable assembly including a wireless power transmission coil; one or more actuators configured to move the movable assembly; a control unit configured to: detect a device to be charged; determine a direction to move the movable assembly; and send one or more control signals to cause the one or more actuators to move the movable assembly in the direction determined by the control unit.

In some implementations, the movable assembly is movable in a plane.

In some implementations, the movable assembly is movable in any direction in the plane.

In some implementations, the movable assembly is movable along each of two perpendicular axes in the plane.

In some implementations, the one or more actuators comprise at least one of a motor, an electromagnet, a linear actuator, or a piezoelectric element.

In some implementations, the one or more actuators comprise a motor mounted to the housing that is configured to move the movable assembly within the internal space.

In some implementations, the one or more actuators comprise a motor mounted to the movable assembly that is configured to move the movable assembly within the internal space.

In some implementations, the one or more actuators comprise electromagnets coupled to the housing of the wireless charger, the electromagnets being arranged to interact with the movable platform to impel movement of the movable platform within the internal space.

In some implementations: the electromagnets comprise electromagnets arranged in a regular pattern, the movable assembly comprises one or more magnetically responsive elements comprising at least one of a permanent magnet, an electromagnet, or a ferromagnetic element, and the movable assembly is located between the regular pattern of electromagnets and the exterior surface such that activation of the electromagnets can impel the movable assembly in each of multiple directions within the interior space.

In some implementations, the control unit is configured to selectively activate different sets of the electromagnets to cause incremental changes in the position of the movable assembly within the internal space.

In some implementations, the housing of the wireless charger defines a track or groove configured to guide a path of movement of the movable assembly within the interior space, and the one or more actuators are configured to move the movable assembly along the track or groove.

In some implementations, the track has a spiral shape.

In some implementations: the exterior surface has a central portion and an outer perimeter, and the track comprises a track segment that extends along a substantially linear path from the central portion toward the outer perimeter.

In some implementations, the wireless charger includes a mechanism configured to (i) rotate the track and the movable assembly together or (ii) rotate in a manner that moves the movable assembly through the track without moving the track.

In some implementations: the exterior surface is a substantially planar surface, the wireless charger includes a rotating element that is configured to rotate within the housing in a plane substantially parallel to the exterior surface, and the track extends in a radial direction with respect to a center of rotation of the rotating element.

In some implementations: the movable platform has an upper side and a lower side facing opposite the upper side, the upper side faces toward the exterior surface, and the movable assembly has rollers, wheels, or bearing balls arranged at the lower side to engage a bearing surface at the interior space and provide omnidirectional movement of the movable platform along the bearing surface.

In some implementations, the movable assembly comprises a magnetic shielding component placed between the wireless power transmission coil and the one or more actuators, the wireless power transmission coil being located between the exterior surface and the one or more actuators.

In some implementations, the wireless charger includes multiple antenna elements for receiving radio-frequency wireless transmissions. To determine the direction to move the movable assembly, the control unit is configured to: determine, using signals from the multiple antenna elements, an angle of incidence of radio-frequency wireless messages transmitted by the device to be charged; and determine the direction to move the movable assembly and/or a position to locate the movable assembly based on the angle of incidence.

In some implementations, the control unit is configured to determine the angle of incidence based on a phase difference between signals received by the multiple antenna elements.

In some implementations, the radio-frequency wireless transmissions are Bluetooth transmissions, Wi-Fi transmissions, or ultra-wideband transmissions.

In some implementations, the control unit is configured to cause the wireless charger to perform the actions of the method described herein.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 10 is a flow chart for a process of self-alignment for wireless charging.

Like reference numbers and designations in the various drawings indicate like elements.

DETAILED DESCRIPTION

Wireless charging can transmit power to electric devices through inductive coupling. It enables a power source, e.g., a charger, to transmit electromagnetic energy to a receiving coil of electrical devices without interconnecting cables. This allows transmission and reception of power though air or another electrically insulated medium via electromagnetic fields, without any electrical conductor to transfer current. Wireless charging can be helpful for various devices, including smart watches, mobile phones, and portable devices.

Wireless charging for electrical devices can involve inductive coupling, where a transmitting coil of a charging station creates a magnetic field that delivers energy to a receiving coil of the electrical device. Inductive power transfer can occur when the transmitting coil of the charging station generates a varying magnetic field across the receiving coil of the electrical device to induce a voltage and current in the receiving coil.

Effective and efficient wireless charging often requires alignment between the transmitting coil of the charging station and the receiving coil of the electrical device. If the transmitting coil and the receiving coil are misaligned, the wireless charging may be hindered or may not occur at all. The wireless charging efficiency is affected by the distance between the electrical device and the wireless charging station and how well the receiving coil and the transmitting coil are aligned (e.g., physically positioned) relative to each other. The magnetic flux density from the transmitting coil that reaches the receiving coil is inversely proportional to the distance cubed, meaning that a small change in distance or a small misalignment often has a large effect on the wireless charging efficiency.

To improve the wireless charging efficiency, a charging station can be configured to move its transmitting coil to align with the receiving coil of the electrical device to be charged.

In many cases, this can relieve a user of the need to precisely align the electronic device to be charged with the wireless charging station. In some implementations, the transmitting coil can move within the housing of the charging station, in some cases omnidirectionally along a plane, to reach alignment with any of various placements of the electrical device on the charging station. This ability can allow the charging station to reach high charging efficiency when a device is placed at any location over an area of the charging station, without requiring the charging station to include multiple power transmitting coils to increase the area in which charging can be achieved.

Figure 1A:
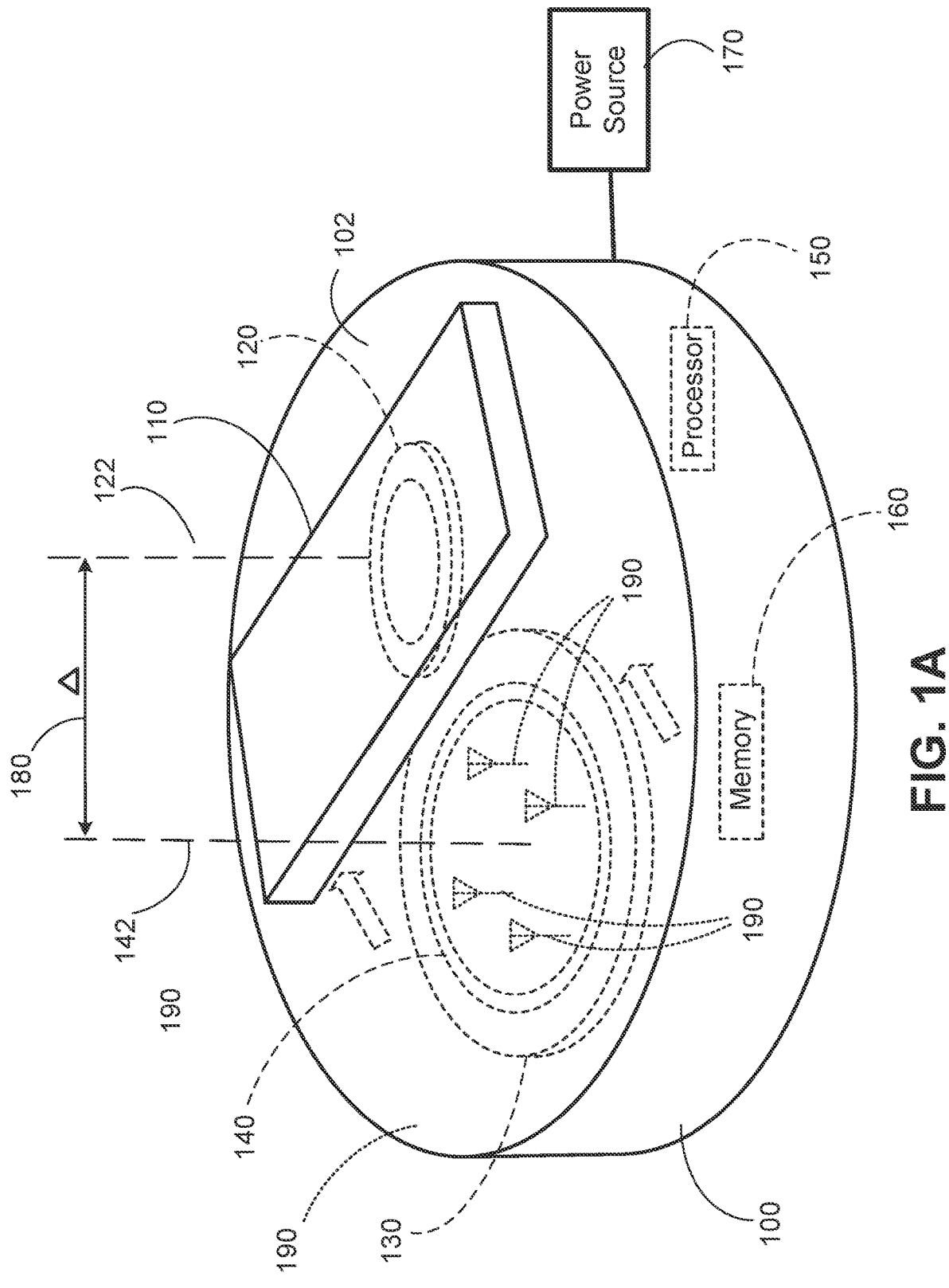
FIG. 1A is a perspective view of an example charging station that can move a wireless power transmitting coil into alignment with an electrical device to be charged.

FIG. 1A is a perspective view of an example charging station 100 that can move a wireless power transmitting coil 140 into alignment with an electrical device 110 to be charged. The charging station 100 includes a transmitting coil 140 configured to wirelessly transfer power. The electrical device 110 includes a receiving coil 120 for wirelessly receiving power.

In the example of FIG. 1A, the electronic device 110 has been placed on a charging surface 102 of the charging station 100, so that the charging station 100 can transfer the power through electromagnetic coupling to the electrical device 110. The electrical device 110 may be, for example, a cellphone, a tablet computer, a laptop computer, a wearable device, a set of headphones, or another battery-powered device.

The charging station 100 has the transmitting coil 140 located at the top of a transmitting coil platform 130 that can move within an interior space of the charging station 100. For example, the charging station 100 can include one or more actuators to move the platform 130 along a horizontal plane.

The transmitting coil 140 has a central axis 142 and the receiving coil 120 also has a central axis 122. The maximum charging efficiency is achieved when the two axes 142, 122 are aligned, in other words, when the centers of the coils 140, 120 are aligned along the same axis. Typically, the axis 142 should at least be located to extend within the area circumscribed by the coil 120 to provide an acceptable amount of magnetic flux to be captured by the coil 120. In the example of FIG. 1A, the electrical device 110 is initially placed on the charging station 100 at a location that is not well aligned with the transmitting coil 140 of the charging station 100. In other words, the transmitting coil 140 and receiving coil 120 have axes 142, 122 or centers that have a relatively large distance 180 between them. As a result of the misalignment, the magnetic flux density at the receiving coil 120 is low, resulting in low efficiency for inductive coupling and power transfer. The overall charging current in the receiving coil 120 may be reduced and the overall wireless charging efficiency may be degraded compared to the position when the axes 142, 122 are coaxial.

To correct for the misalignment, the charging station 100 is configured to move the transmitting coil platform 130 to align the transmitting coil 140 with the receiving coil 120 of the electrical device 110, to improve the overall efficiency of power transfer. Here, the alignment of the receiving coil 120 and the transmitting coil 140 can be improved by reducing the distance 180 between the axes 142, 122 of the receiving coil 120 and the transmitting coil 140. In some implementations, the desired alignment can be defined as a position in which the distance 180 is less than or equal to a distance threshold value. As another example, the desired alignment can be defined in terms of coupling efficiency, where the desired alignment is a position at which at least a minimum threshold level of power transfer efficiency is obtained.

The charging station 100 can be configured to detect when misalignment occurs and to move the transmitting coil 140 into better alignment in response. When the misalignment between the axes 122 and 142 results in efficiency below a predetermined threshold level, the charging station 100 determines that the receiving coil 120 and transmitting coil 140 are misaligned and that movement of the platform 130 is needed. In that case, as shown in FIG. 1A, the charging station 100 moves the transmitting coil platform 130 towards the receiving coil 120 of the electrical device 110.

The charging station 100 can use any of various techniques to determine which direction to move the platform 130. For example, the charging station 100 can move the platform 130 to different positions, measure the transfer efficiency at each position, and then move the platform to a position determined to have the highest efficiency (or at least an acceptable minimum level of efficiency). As another example, the charging station 100 can determine or estimate the position of the device 110 on the charging surface 102 and the position of the coil 120 within the device 110. For example, the charging station 100 can include optical sensors, capacitive sensors, or resistive sensors placed along the charging surface 102 to capture information about which portions of the charging surface 102 are covered by the device 110, contacted by the device 110, or have a force exerted on them by the device 110. As another example, the charging station 100 can use image data from the device 110 or from a sensor of the charging station 100 to determine a current position of the device 110 or a trajectory along which the device 110 approached its current position. As another example, the charging station can include pressure sensors or force sensors to sense force from the device 110 on the charging surface 102. The force differential at different sides of the charging station 100 can indicate which region (e.g., side, quadrant, sector, or other region) of the charging surface 102 the device 110 is located on.

Another technique that the charging station 100 can use to determine the direction to move the platform 130 into alignment for charging is to evaluate characteristics of wireless transmissions from the device 110. For example, the charging station 100 may determine angles at which incident radio waves from the device 110 reach the charging station 100. The charging station 100 can use the angles of incidence to determine a location of the electrical device 110 on the charging surface 102. Based on the determined location of the electrical device 110, the charging station 100 moves the platform 130 to align the transmitting coil 140 with the receiving coil 120.

As shown in FIG. 1A, the charging station 100 includes multiple antennas 190 that receive radio waves from the electrical device 110. The antennas 190 can be spaced apart with known distances and orientations between them. In this example, four antennas 190 are included on the movable platform 130. Antennas 190 may alternatively be placed at other locations, such as around an outer wall of or outer portion of the charging station 100. Antennas 190 may at other locations, including at locations that are more centrally located under the charging surface 102 or regularly spaced apart along the charging surface 102.

Devices to be charged, such as the device 110, can be configured to perform a handshake procedure using communication over BLUETOOTH (e.g., Bluetooth Low Energy (BLE)), Wi-Fi, or ultra-wideband (UWB) communication links. This process can communicate location information. For example, the device 110 can be configured to detect indicators of its position with respect to the charging station 100, e.g., using a camera or other sensor to detect features of the charging station 100 as the device 110 is brought into proximity of the charging station 100. In addition, or as an alternative, radiofrequency signals transmitted by the device 110 that provide other information can also be used by the charging station 100 to determine the location of the device 110. In other words, the transmitted signals themselves, regardless of data content, can indicate the location of the device 110.

As an example, the electrical device 110 may transmit radio waves to communicate an identifier for the device 110. For example, the identifier may be a string inside a data field of a packet transmitted using Bluetooth Low Energy (BLE), Wi-Fi, ultra-wideband (UWB), or another communication protocol. Other data may be transmitted such as data indicating power needs of the device 110, preferences of the device 110, or other data, and these transmissions can be used for location detection. The charging station 100 uses the antennas 190 to detect the radio waves sent by the device 110, and based on the received transmissions can initiate processing and communication to locate the device 110, move the platform 130, and begin charging. As the charging station 100 receives transmissions from the device 110, the charging station 100 calculates an angle of incidence for each of various transmissions.

The charging station 100 can begin tracking the direction of arrival of transmissions from the device 110 reaches the charging surface 102, so that the charging station 100 calculates angles of incidence of transmissions made by the device 110 while the device 110 is moving toward the charging station 100. The charging station 110 can calculate a series of angles of incidence for transmissions made from different positions with respect to the charging station 100. This enables the charging station 100 to track the direction at which the device 110 is approaching the charging station 100. The charging station 100 evaluates the calculated angles of incidence to determine when the position of the device 110 stabilizes, e.g., when the device has come to rest on the charging surface 102. This condition can be identified when the calculated angles of incidence remain consistent over time, e.g., newly calculated angles do not change by more than a threshold amount for at least a minimum amount of time or for at least a minimum amount of samples. For example, the charging station 100 can select several samples of the angle of incidence, filter out noise (e.g., removing outlier samples or smooth to address expected variability), and use the filtered series of angles of confirm that the electrical device 110 is stationary on the charging surface 102. Once the charging station 100 determines that the device 110 is present and is stationary, the charging station 100 can use angle of incidence information, triangulation, or other techniques to determine a direction of movement and/or a destination location for the platform 130.

Figure 1B:
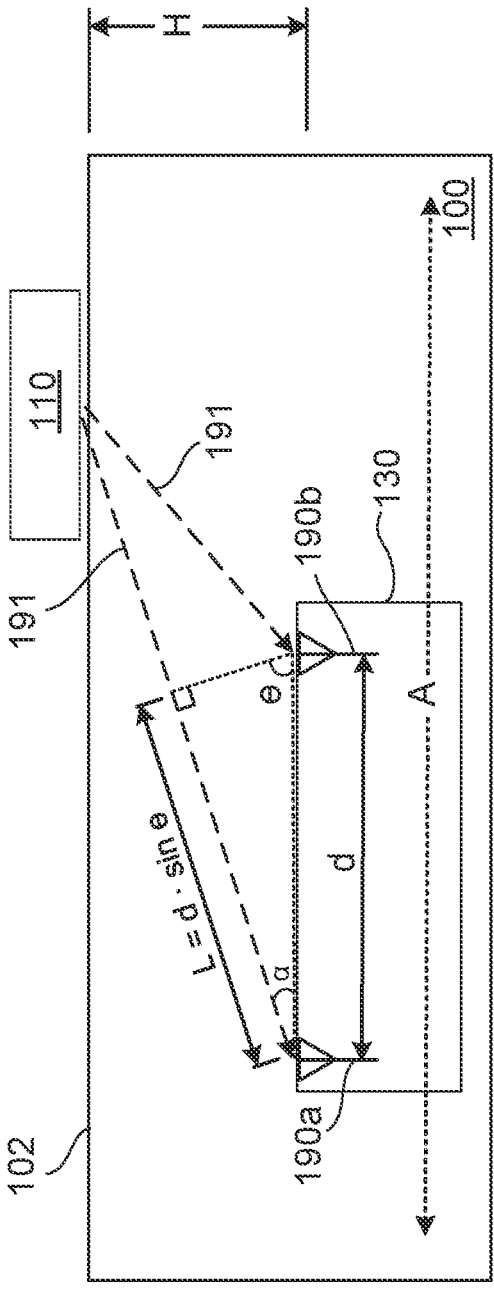
FIG. 1B is a cross-sectional view of an example of a technique for an example charging station to calculate an angle of incidence of a transmission from an electrical device to be charged.

FIG. 1B illustrates an example of a technique for the charging station 100 to calculate the angle of incidence of a transmission from the device 110. The figure shows a side cutaway view of some elements of the charging station 100 and the device 110. For purposes of illustration, the relative distances in FIG. 1B are not shown to scale. For example, the distance or height H between the top of the platform 130 (e.g., where the power transmitting coil 140 is located) and the charging surface 102 is typically very small to maximize inductive coupling. Nevertheless, the height H has been enlarged in the example to better allow for clarity in illustration.

As discussed above, the charging station 100 has multiple antennas 190 to receive radiofrequency transmissions. In this example, two antennas 190a, 190b are spaced apart by a predetermined distance d. The antennas 190a, 190b are mounted on or integrated with the movable platform 130, and can both be located at a fixed relationship to each other on the platform 130. The antennas 190a, 190b can be arranged so that the distance d between them is less than a single wavelength used by the device 110 to communicate with the charging station 100. For example, BLUETOOTH and WI-FI may use signals in the 2.4 GHz band, which has a wavelength of approximately 12.5 cm, and WI-FI in the 5 GHz has a wavelength of approximately 6 cm. The distance d can be less than the wavelength, and in some cases half of the wavelength or smaller, such as a quarter of the wavelength. The charging station 100 can store a value or other data that indicates at least an approximate wavelength for the communication channel, so the wavelength value can be used in computations.

The device 110 transmits a radiofrequency signal 191, which is received by both of the antennas 190a, 190b. The charging station 100 receives signals that the antennas 190a, 190b generate and determines a phase difference, $\Delta\Phi$, between the signals produced by the two antennas 190a, 190b. The charging station can then use the phase difference, $\Delta\Phi$, to determine a direction and/or location to move the platform 130. When the device 110 is located closer to the antenna 190b than to the antenna 190a, the signal from the antenna 190b leads the signal from the antenna 190a. This is the case shown in FIG. 1B. On the other hand, if the device 110 were transmitting from a location to the left of antenna 190b, the signal from antenna 190a would lead the signal from the antenna 190b.

In some implementations, the charging station 100 can determine whether the phase shift, $\Delta\Phi$, is positive or negative, and use the determination to indicate which side of the platform 130 the device 110 is located. In other words, the sign of the phase difference can indicate which direction of the platform 130 the device 110 is located along an axis, A, between the antennas 190a, 190b. In some implementations, the distance d, the wavelength of the transmission 191, and the range of motion of the platform 130 can be arranged so that, when the device 110 is at the extremity of the region that can be charged and the platform 130 is in a central position, the maximum phase shift is less than 180°. This can avoid ambiguity, for example, whether a detected phase shift represents +270° or −90°.

As another technique that the charging station 100 may use to determine the position of the device 110 is to evaluate changes in the phase difference as the platform 130 is moved relative to the device 110. After measuring a first phase difference, the charging station 100 can move the platform 130 incrementally and measure a second phase difference for the signals received at the new position of the platform 130. If the platform 130 is moved toward the device 110 along the axis through the antennas 190a, 190b, then the second phase difference will be greater than the first phase difference. On the other hand, if the platform 130 has moved away from the platform 130, the second phase difference will be greater than the first phase difference. Thus, by assessing the change in phase difference as the platform 130 moves, the charging station 100 may determine the direction along axis A from which the transmission 191 was sent, even if the charging surface 102 is large enough to allow multiple positions of the device 110 that would result in the same phase difference. This can allow the charging station 100 to permit a much larger charging surface 102, such as a charging surface 102 with a radius of, e.g., 1, 2, 3, or more times the wavelength of the transmission 191.

When the transmitter of the device 110 is located over the platform 130, the phase difference, $\Delta\Phi$, will be zero. The charging station can use feedback control to continue moving the platform 130 in the appropriate direction until the phase difference reaches or nears zero, and then use measures of inductive coupling between the power transmitting coil 140 and the power receiving coil 120 to determine if the coils are in alignment. In a large charging surface 102, there may be positions that are different from the alignment position but still result in a phase difference of zero. At these non-aligned positions the charging station 100 would detect poor inductive coupling or lack of inductive coupling and so would continue to move the platform 130 in the direction toward the device 110, toward the next zero-phase-difference position.

The charging station 100 may use the phase difference, $\Delta\Phi$, to determine a distance to move the platform 130 or a destination for the platform 130. For example, the magnitude of the phase difference, $\Delta\Phi$, can be correlated to a distance along axis A to move the platform 130. The distance may be retrieved from a look-up table stored by the charging station 100 that associates phase differences to distances of movement or movement commands. As another example, the charging station 100 may calculate the distance to move the platform 130. This may be done using trigonometric relationships or other functions. Because the height H is very small in practice, the transmission can be assumed to travel approximately parallel to the antennas 190*a*, 190*b*. The difference in phase can thus be considered to be indicative of a difference in the path length for travel of signals from the transmitter in the device 110 to reach the respective antennas 190*a*, 190*b*. In other words, a phase difference of 90° can be determined to represent that the path distance is one quarter of a wavelength longer to reach the antenna 190*a* than the antenna 190*b*. The difference in path length can be considered to be the length L as a leg of a right triangle. The charging station can then use various relationships of the sides and angles of the right triangle to determine an angle of incidence, $\alpha$, for the incident transmission 191. The charging station may alternatively calculate an angle $\theta$, for a vector normal to the incident transmission 191. The angles can be calculated using the equations 1 to 3 below.

$$\Delta\Phi = \frac{2 \cdot \pi \cdot d \cdot \sin\theta}{\lambda} \qquad \text{(Equation 1)}$$

$$\Theta = \sin^{-1}\left(\frac{\lambda \cdot \Delta\Phi}{2 \cdot \pi \cdot d}\right) \qquad \text{(Equation 2)}$$

$$\alpha = 90^2 - \theta \qquad \text{(Equation 3)}$$

Figure 4:
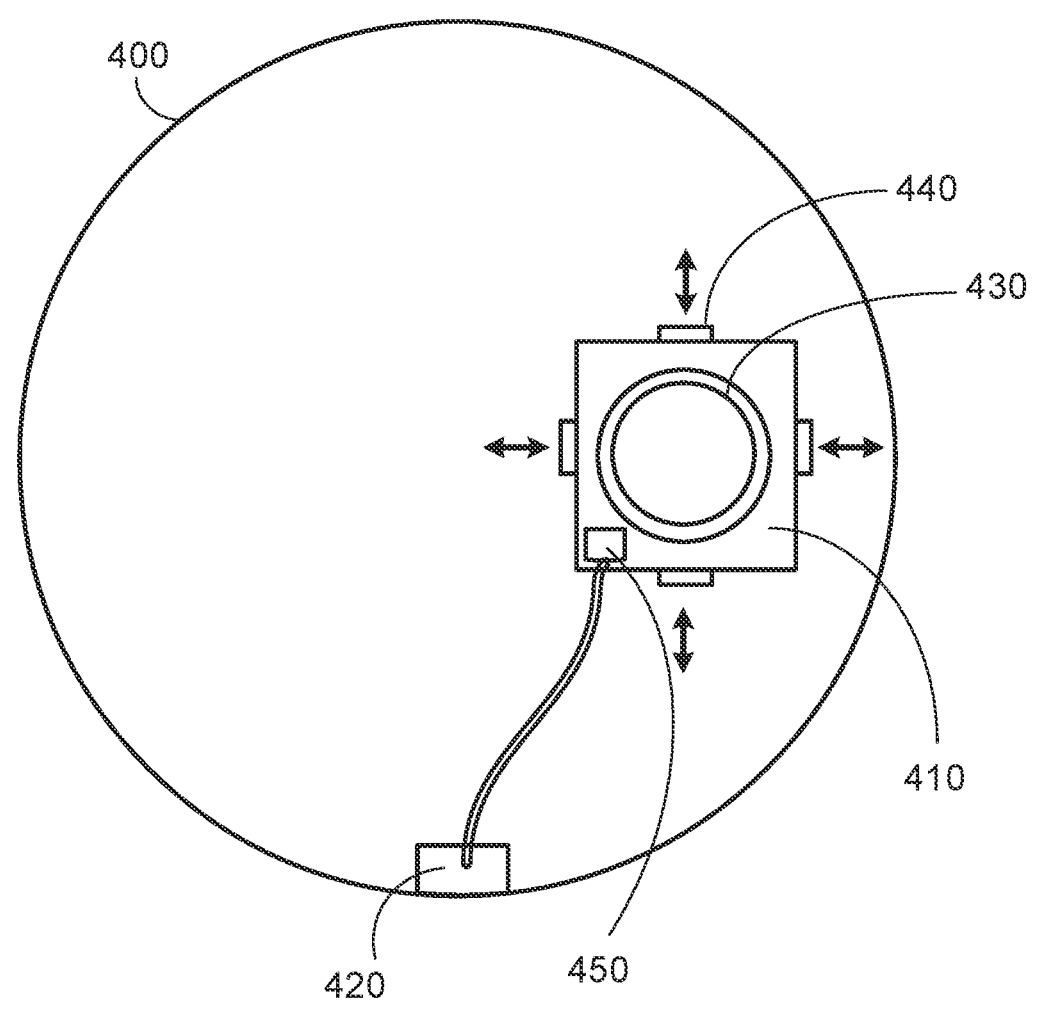
FIG. 4 is a top view of another example charging station.

Under appropriate conditions, the equations above can be simplified. For example, when $\Theta$ is small, sin $\Theta$ can be approximated as simply $\Theta$ itself. Consequently, the arcsine operator of Equation 2 may also be omitted when $\Theta$ is small, as shown in FIG. 4 below. Because the height, H, is minimized in practical applications, these approximations can provide sufficient accuracy in some implementations.

$$\Theta = \frac{\lambda \cdot \Delta\Phi}{2 \cdot \pi d} \qquad \text{(Equation 4)}$$

Figure 1C:
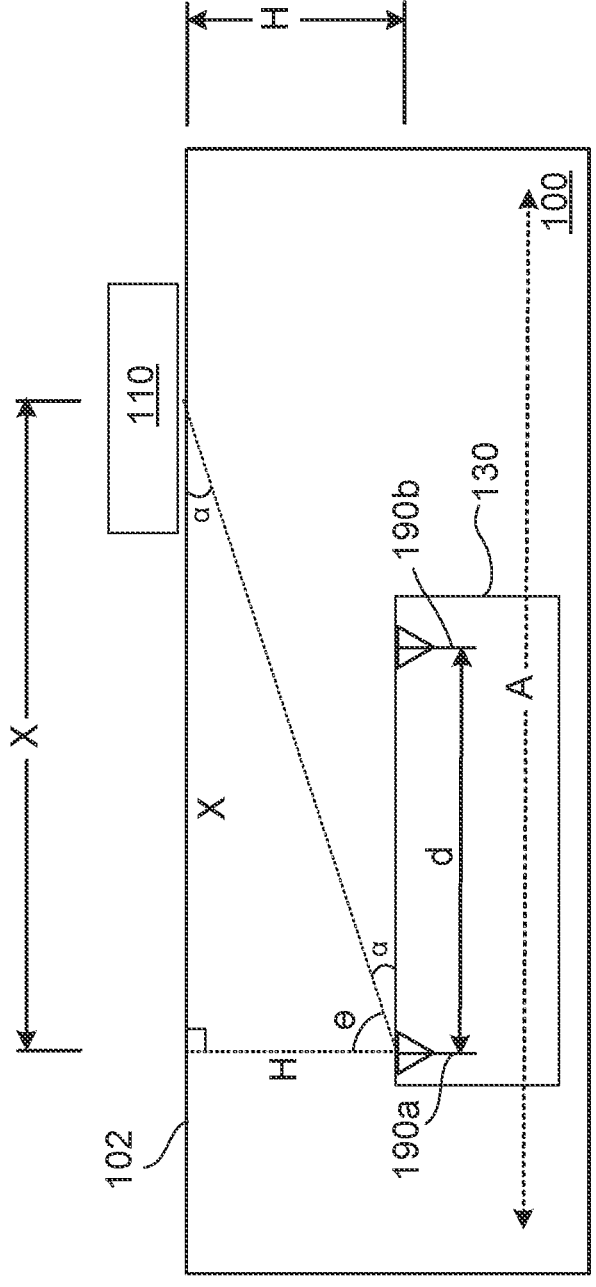
FIG. 1C is a cross-section view of an example of calculating a distance to move a platform inside an example charging station for charging.

FIG. 1C shows a technique of calculating a distance to move the platform 130. The phase difference analysis of FIG. 1B indicated the direction to move the platform 130 toward an alignment position with respect to the device 110, e.g., to the right along axis A. The angles and relationships discussed above can also be used to determine the distance to move the platform 130. FIG. 1C shows a right triangle in which the vertical edge is height H from the power transmitting coil 140 to charging surface 102 of the charging station 100, and the angles $\alpha$ and e are as calculated above. The distance, X, represents the distance along axis A between the antenna 190*b* and the transmitter of the device 100. This distance may be calculated using the any appropriate technique, such as law of sines as expressed in Equation 5 below.

$$X = \frac{H}{\sin\alpha} \cdot \sin\theta \qquad \text{(Equation 5)}$$

The charging station 100 may optionally adjust the distance X before generating and issuing commands to move the platform 130. For example, the charging station 100 may reduce the distance X by one half of the distance d, to account for the space between the antennas 190*a*, 190*b*. Similarly, the charging station 100 may apply offsets or corrections to adjust for other relationships, such as an offset of the position of the antennas 190*a*, 190*b* with respect to the power transmitting coil 140, a position of the transmitter of the device 110 relative to the power receiving coil 120 of the device 110, and so on. The charging station 100 can then generate commands to move the platform 130 by the determined distance and in the determined direction. According to a current position of the platform 130 in the housing of the charging station 100, the charger can then calculate a direction and a distance to move the platform 130 to align the transmitting coil 140 and the receiving coil 120.

Additional techniques that the charging station 100 may use to determine the direction to move the platform 130 are discussed below, including with respect to FIG. 8. The charging station 110 may use multiple techniques in combination to better locate the device 110 and find an alignment position. For example, the direction and distance calculations of FIGS. 1B and 1C need not be exact, and as the platform 130 nears the position for alignment with the power receiving coil 120, measures of inductive coupling can be used to fine-tune the position to achieve even greater efficiency.

The examples of FIGS. 1B and 1C show two antennas 190*a*, 190*b* and explain how directions and/or distances can be calculated along one axis, axis A. The charging station 100 can include one or more additional antennas 190 (as shown in FIG. 1A) which can be used to determine directions and/or distances along an axis transverse to axis A. For example, another pair of antennas 190 can be arranged in a line perpendicular to axis A (e.g., in a direction into and out of the page with respect to FIGS. 1A and 1B). The techniques discussed with respect to FIGS. 1A and 1B can be used with this additional pair of antennas 190 to allow 2-dimensional vector for movement of the platform 130 in a plane along the charging surface 102 and/or to determine distances to move the platform 130 along two perpendicular axes. Similar results can be obtained using only one additional antenna, e.g., located perpendicular to axis A but aligned with either antenna 190*a* or antenna 190*b*, so that the additional antenna and one of antennas 190*a*, 190*b* form the second antenna pair. Indeed, with appropriate functions for processing the generated signals, the antennas 190 need not be aligned in perpendicular lines to compute a two-dimensional direction vector and position of the device 110.

Referring again to FIG. 1A, the charging station 100 can continue moving the transmitting coil platform 130 until the distance 180 is equal or less than the distance threshold value. In some implementations, the charging station 100 can move the platform 130 to a position that the wireless charger calculated to satisfy this relationship, e.g., to be within a threshold distance of the receiving coil 120. In other implementations, the charging station 100 can determine that an appropriate alignment position has been achieved by monitoring the power transfer efficiency. That is, the charging station 100 can adjust the position of the platform 130 until the charging station 100 detects that at least the minimum level of power transfer efficiency is achieved. The charging station 100 can engage in data communication with the device 110 to receive indications of received power by the device 110 to facilitate this calculation. For example, the device 110 may send information through the inductive coupling, for example, by modulating the effective impedance of the coil 120 to provide data to the charging station 100. As another example, the device 110 and charging station 100 may communicate via a short-range wireless radiofrequency communication link, such as BLUETOOTH, Wi-Fi, or ultra-wideband communications. More details regarding the alignment of transmitting and receiving coils is discussed with respect to FIGS. 2-7.

Once the charging station 100 has moved the transmitting coil platform 130 into alignment, the charging station transfers power wirelessly to the electrical device 110 using magnetic induction between transmitting coil 140 and the receiving coil 120. The new position of the transmitting coil 140 under the receiving coil 120 allows for better magnetic coupling than the initial position when the user first placed the device 110 on the charging surface 102. Through the inductive coupling, current and voltage are induced in the receiving coil 120. The output voltage of the receiving coil 120 is then rectified and used by the electrical device 110, for example, to operate the electrical device 110 and to charge a battery of the electrical device 110.

The charging station 100 includes a processor 150 configured to make the calculations, determinations, and control decisions to perform alignment of the transmitting coil 140. This processing can include determining the positional relationship between the transmitting coil 140 and the receiving coil 120, and determining a direction to move the platform 130 carrying the transmitting coil 140. The processor 150 can infer the spatial relationship and/or determine a direction to move the platform 130 using, for example, information indicating signal strength of detected signals, efficiency of power transfer, a degree of magnetic coupling, sensor data, a phase difference between radio-frequency signals incident to the charging station 100 (e.g., enabling determination of an angle of arrival vector), etc.

The charging station 100 also includes memory 160 to store software and data. The processor 150 can execute various functions based on instructions stored in the memory 160. The memory 160 may store an application or code configured to perform functions such as detecting the presence of a device to be charged, determining a position to move the platform 130, generating control instructions to move the platform 130, determining that an appropriate alignment has been achieved, etc. The memory 160 may store data, for example, data indicating a calculated or estimated location of electrical device 110 on the charging station 100, and data indicating a path for the platform 130 to travel or a destination location for the platform 130 to reach. The memory 160 can include random access memory (RAM), and can also include non-volatile memory, such as a magnetic storage device, a flash memory device, or another storage device.

The charging station 100 is also connected to an external power source 170, which may be, for example, a wall outlet, a DC source in a vehicle, a battery, a computer, a Universal Serial Bus (USB) port, or other power source.

Figure 2A:
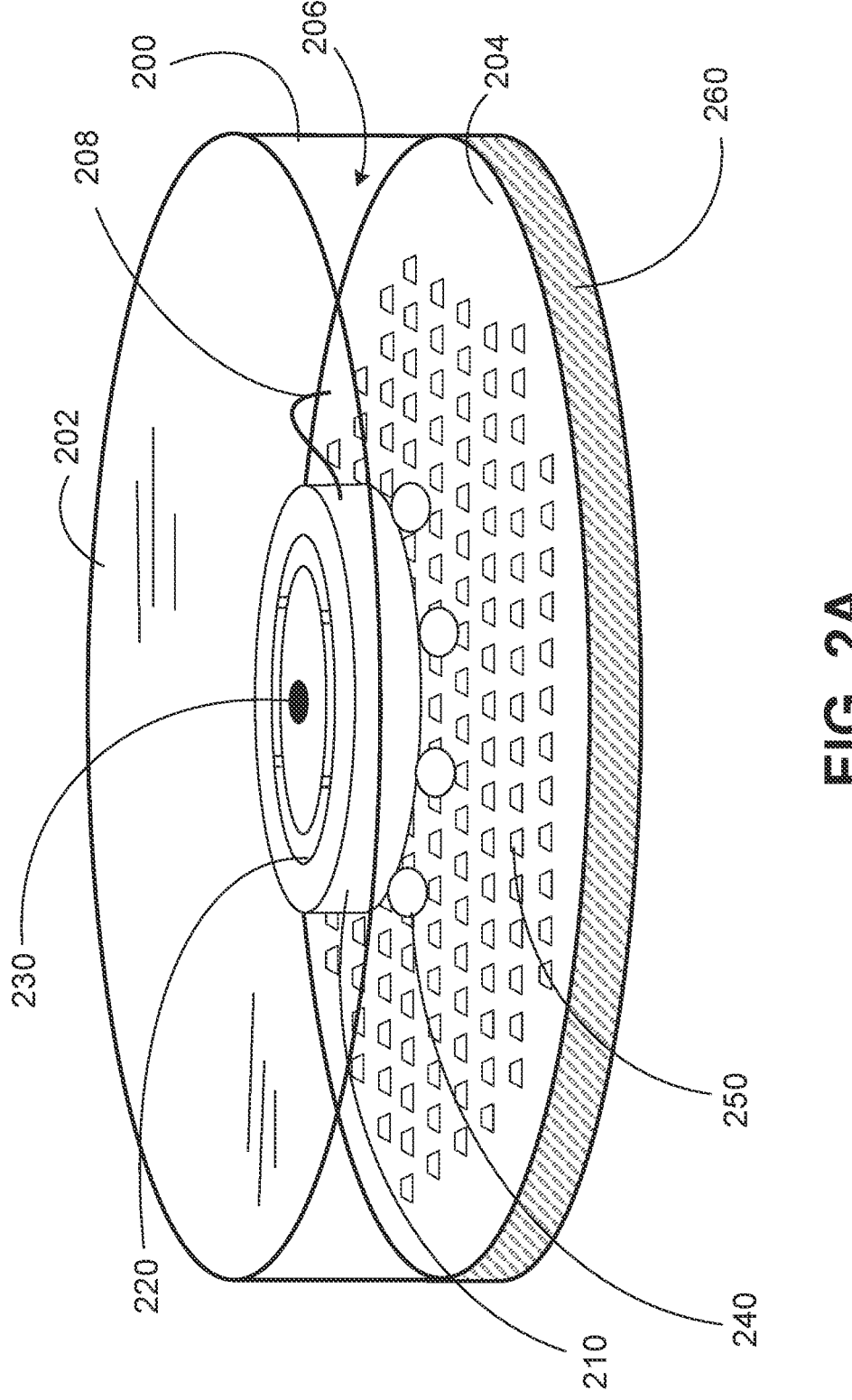
FIG. 2A is a perspective view of an example charging station with a grid of electromagnets configured to move an internal assembly having a wireless power transmitting coil.

FIG. 2A is a perspective view of an example charging station 200 with electromagnets 250 configured to move an internal assembly or platform 210 that includes a wireless power transmitting coil 220. This charging station 200 includes electromagnets 250 located on a bottom portion of the charging station 200. The electromagnets 250 are configured to interact with a magnet 230 in the platform 210 and exert a force on the magnet 230 to cause the platform 210 to move within an internal space 206 within the charging station 200. In this manner, the electromagnets 250 are actuators to move the platform 210 to an appropriate position for charging a device placed at any of various locations on a charging surface 202 of the charging station 200. The electromagnets 250 can be arranged in a regular pattern, such as with a consistent spacing and spatial relationship between neighboring electromagnets and a repeating pattern of electromagnets 250. In this example, the electromagnets 250 are arranged in a grid. The charging station 200 also includes an electromagnetic interference (EMI) shielding layer 260 configured to limit interference of the electromagnets 250 with other devices.

The charging station 200 includes a transmitting coil platform 210. In this example, the transmitting coil platform 210 comprises rollers or other bearing elements attached at the bottom of the platform 210, reducing friction between the platform 210 and a surface 204 within the housing of the charging station 200. The platform 210 rests on and moves along the surface 204 of the charging station 200. The transmitting coil 220 is located on the top of the platform 210, and at least one permanent magnet 230 is included in the platform 210, for example, at the center of the transmitting coil 220.

Although omitted for clarity in illustration, the charging station 200 includes control circuitry and electrical drive circuitry to power the transmitting coil 220, which can include the processor 150 and memory 160 of FIG. 1A. The charging station 200 can include one or more wires, cables, flexible conductive ribbons, or other flexible conductors 208 that connects the transmitting coil 220 on the platform 210 to electronics at a fixed position in the housing of the charging station 200. Drive signals to activate and power the transmitting coil 220 can be provided through the conductors 208. The conductors 208 can be sufficiently long to permit the platform 210 to travel to the boundaries of the internal space 206 without limiting movement.

In this example, the charging station 200 moves the transmitting coil platform 210 by selectively activating the electromagnets 250. By varying the combinations of electromagnets 250 activated, varying the polarity of activation, and varying the and strength of activation (e.g., drive current applied to the electromagnets 250), the charging station 200 can vary the magnetic field that reaches the permanent magnet 230 and thus the direction and amount of movement of the platform 210 within the internal space 206. The charging station 200 is configured to adjust the location of the transmitting coil platform 210 and thus align the transmitting coil 220 with the receiving coil of a device to be charged for efficient wireless charging. As shown in FIG. 2A, the electromagnets 250 can be organized in a two-dimensional grid on the bottom portion of the charging station 200, allowing great versatility in the amount and direction of magnetic fields that can be applied to move the platform 210.

The electromagnets 250 may include wire wound into a coil around a magnetic metal, where the magnetic field is produced by an electric current flow through the wire. The electric current may be provided by a power source of the charging station 200, and the magnetic field disappears when the current is turned off. This is beneficial because once the electromagnets 250 have impelled the platform 210 into a desired position for charging, the electromagnets 250 can be powered off and will no longer create magnetic fields that may interfere with charging.

In some implementations, the electromagnets 250 are configured to manipulate the strength of the magnetic field and the polarity of the magnetic field that interact with the permanent magnet 230 by controlling the amplitude of the electric current in the winding and the direction of the electric current, respectively. The charging station 200 can control the electromagnets 250 to switch on in groups to progressively move the platform 210 to a desired location. For example, groups of electromagnets 250 can be activated in sequence, e.g., from the left side of the charging station 200 to the right side of the charging station 200 to move the platform from left to right. More generally, a processor or control circuitry of the charging station 200 can determine the direction to move the platform 210 to reach an alignment position, and then can determine the electromagnet activation parameters (e.g., identity of which electromagnets 250 to activate, an amount of current to apply, a current direction, a duration of current application, a sequence of electromagnet groups to activate, etc.) to move the platform 210 to a desired location for charging. As discussed above, the location can be one in which the transmitting and receiving coils at least partially overlap in the vertical direction, e.g., where distance between the axes is equal to or less than a preset threshold value and/or the magnetic coupling or power transfer efficiency satisfies a threshold. The electromagnets 250 drive the movement of the transmitting coil platform 210 by generating magnetic fields having same polarity to that of the permanent magnet 230 in order to repel the permanent magnet 230 in the direction of desired movement of the platform 210. The electric current to the electromagnets 250 may be turned off once the alignment of the transmitting and receiving coils is completed.

In some implementations, the electromagnets 250 are switched on in a predetermined sequence, for example, starting from the edges of the grid and working inward to the center, to move the movable transmitting coil platform 210 to the center of the charging station 200 after charging is finished.

In some implementations, one or more electromagnets can be used in the platform 210 instead of a permanent magnet 230. The control circuitry of the charging station 200 can activate the electromagnet(s) of the platform 210 concurrently with the activations of the electromagnets 250 so that the electromagnets interact to move the platform 210.

Figure 2B:
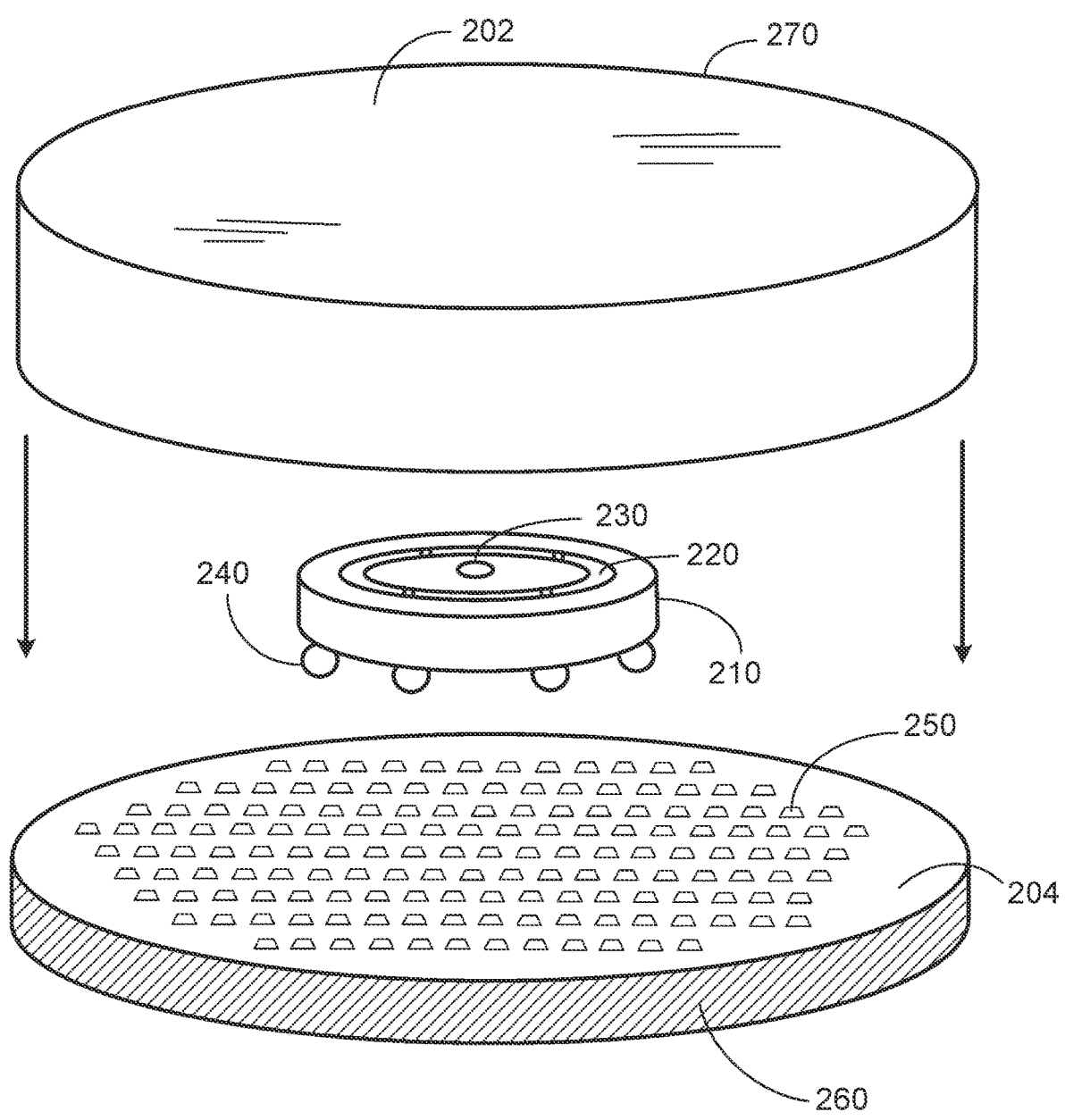
FIG. 2B is an exploded view of the charging station of FIG. 2A.

FIG. 2B shows an exploded view of the charging station 200, including a top case 270, the transmitting coil platform 210, the grid of electromagnets 250, and the EMI shielding layer 260. In this example, the transmitting coil platform 210 is smaller than the internal space 206 of the charging station 200 to allow movement of the transmitting coil 220 within the charging station 200. The electromagnets 250 may be arranged in a honeycomb pattern or in other patterns. The number of electromagnets 250 in the grid can be different from the number shown in FIGS. 2A and 2B. In general, more electromagnets 250 will increase alignment speed and accuracy, although beneficial results can be achieved using only a few electromagnets 250 spaced apart along the surface 204. The transmitting coil platform 210 comprises rollers or other bearing elements 240 located at the bottom side of the platform. For example, the platform 210 may have eight rollers distributed along the circumference of the bottom edge of the platform 210. The rollers 240 facilitate the movement of the transmitting coil platform 210 by reducing friction and allowing movement of the transmitting coil platform 210 along a horizontal plane (e.g., along surface 204). The EMI shielding layer 260 is located at the bottom of the charging station 200, and is configured to block electromagnetic fields from the electromagnets 250 by conductive materials or magnetic materials in the EMI shielding layer 260.

In this example, the attraction or repulsion between the permanent magnet 230 and the electromagnets 250 moves the platform 210 and thus sets the position of the transmitting coil 220 in the charging station 200. The electromagnets 250 enable movement of the transmitting coil 220 to align with a receiving coil for efficient wireless charging, without the need for a permanent magnet on the electrical device to be charged.

Figures 3A, 3B:
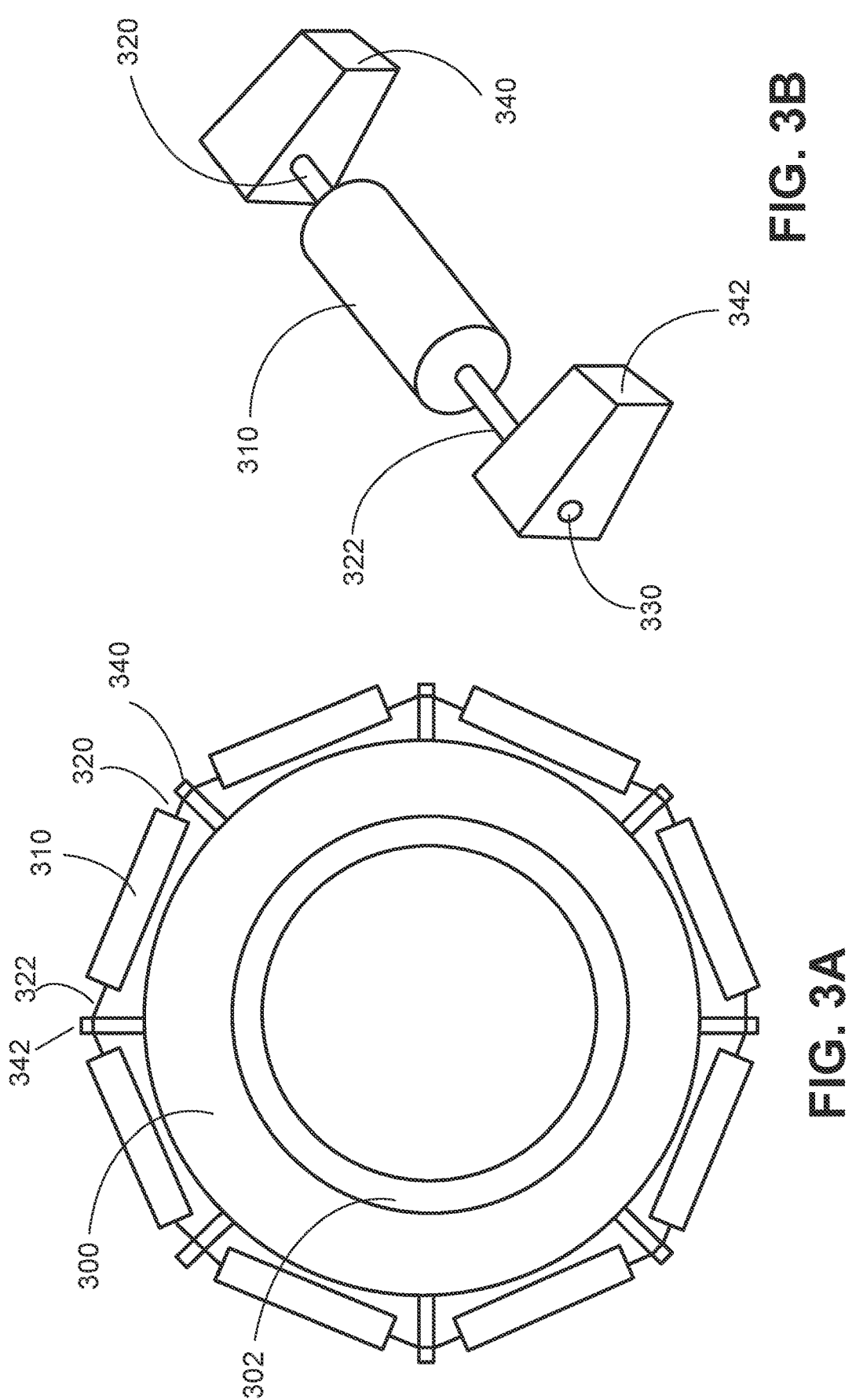
FIG. 3A is a top view of an example movable transmitting coil platform.
FIG. 3B is a perspective view of a roller portion of the transmitting coil platform of FIG. 3A.

FIG. 3A is a top view of another example transmitting coil platform 300. Similar to the movable platforms 210 and 130 discussed above, the platform 300 carries a wireless power transmitting coil 302 within the internal space of a charging station. The platform 300 is configured to move itself using powered rollers 310 rather than being moved by electromagnets in a housing of a charging station. In this example, the transmitting coil platform 300 comprises eight rollers 310 that are attached to the bottom side or edge of the transmitting platform 300. The rollers can be wheels, cylinders, or other rotatable elements. In some other implementations, the transmitting coil platform 300 comprises other amounts of rollers 310, for example, four rollers or sixteen rollers, to assist the movement of the transmitting coil platform 210 omnidirectionally of the plane. In this example, each of the rollers 310 is coupled with a pair of shaft portions 320 and 322, and a pair of supports or cantilevers 340 and 342. The stator 310 is coupled to the cantilevers 340 and 342 through the shaft 320 and 322. The cantilevers 340 and 342 extend from the side of the transmitting coil platform 300, to couple the rollers 240 to the transmitting coil platform 210.

FIG. 3B is a perspective view of one of the rollers 310 on the movable platform 300. This figure shows an example of how a roller 310 can be powered. In this example, the roller 310 includes a motor stator (e.g., a direct current motor stator) fixed within the roller 310. A rotor is placed within the motor stator, and the shaft of the rotor extends out from the roller 320 as one of the shaft portions 320, 322. For example, the shaft portion 320 can represent the shaft portion of the rotor. The shaft portion 320 is attached to a support or cantilever 340. The shaft portion 320 has a fixed, non-rotatable connection with the cantilever 340, which in turn is fixed to the platform 300. As a result, activating the motor in the roller 310 causes the motor stator and the roller 310 that contains it to turn, while the shaft portion 320 and the rotor of the motor remain fixed in place. The other shaft portion 322 provides support and alignment, but can be arranged to freely rotate, either within the support or cantilever 342 or within the roller 310. Power and control signals for the motor are routed to the motor through the fixed shaft portion 320 and the cantilever 340. In this configuration, the stator 310 is supported by the fixed shaft 320 and receives power and control signals through the corresponding cantilever 340. On the other hand, the stator is coupled to the bearing 330 on the other cantilever 342 by the rotatable shaft 322.

When electrical power is delivered to the motor stator in the roller 310, an internal coil of the motor stator will generate a magnetic field and induce movement of the motor stator in the roller 310 with respect to the rotor that includes shaft portion 320. Because the shaft portion 320 is fixed in place with respect to the cantilever 340 and is not rotatable, the generated force will drive the rotation of the roller 310 that includes the motor stator. In this case, the roller 310 acts as a roller or a wheel to drive the movement of the transmitting coil platform 300 in a corresponding direction. The configuration of the power supply and control on each of the rollers 310 may be independent, and thus each of the rollers 310 can be controlled to rotate and drive the movement of the transmitting coil platform 300 in the corresponding direction. By independently control of the rollers 310 and/or coordinated control of the rollers 310, the charging station 200 is able to move the transmitting coil platform 210 omnidirectionally in horizontal plane to align the transmitting coil with the position of a receiving coil of a device to be charged. The roller 310 may have a cylindrical shape or a spherical shape, to ease its rotation for driving the movement of the transmitting coil platform 300.

FIG. 4 is a top view of another example charging station 400. The charging station 400 has a motor 450 attached to and carried with (e.g., integrated with) a movable transmitting coil platform 410. Rather than include motors integrated within each rotatable element, the platform 410 may include one or more motors that drive wheels, rollers, or rotatable elements in another manner, e.g., through gears, belts, or other mechanisms. The charging station 400 includes control circuitry 420, the transmitting coil platform 410, and a wireless power transmitting coil 430. Additionally, the transmitting coil platform 410 comprises a plurality of rotating element 440 (e.g., wheels, rollers, etc.) that are located at the edge of the platform 410 and are driven by one or more motors 450. The one or more motors 450 receive supply power and control signals from the control circuitry 420 through power cable 460. In this example, the one or more motors 450 is configured to drive the movement of the transmitting coil platform 410 by controlling the rotation of the rollers 440. In response to the control signals or drive signals, the motor 450 sets rotation speed and rotation directions of each of the rollers 440, and thus moves the transmitting coil platform 410 in a horizontal plane of the charging station 400. In this example, the transmitting coil platform 410 is moved to a position having the transmitting and receiving coils aligned for efficient wireless charging. As shown in FIG. 4, the transmitting coil platform 410 is in a rectangular shape and has four rollers 440 attached at each edge of the transmitting coil platform 410. In some other implementations, the transmitting coil platform 410 may have a different shape and has various number of rollers.

In this example, the charging station 400 detects the placement of an electrical device on the charging station 400 and determines an alignment state between the transmitting coil 430 and a receiving coil of the electrical device. For example, the charging station 400 determines based on attempts to transfer power that the transmitting coil and receiving coil are misaligned. As another example, the charging station 400 can determine a location of the device to be charged using sensors, and determine that the transmitting coil needs to be moved to reach alignment. The charging station 400 can then use the control circuitry 420 to deliver power and control signals to the one or more motors 450. In response, the one or more motors 450 drive at least one of the rollers 440 to rotate and move the transmitting coil platform 410 to align the transmitting coil with the receiving coil of the device to be charged. Once the charging station 400 detects that the transmitting and receiving coils are aligned, the control circuitry 420 stops delivering power to the one or more motors 450, and the transmitting coil platform 410 is stabilized at the aligned position by freezing the rotation of the rollers 440. Wireless charging then proceeds in the aligned position.

In some implementations, a charging station can include one or more stationary motors that are configured to move a transmitting coil platform but are attached to the housing rather than moving with the platform. For example, one or more motors may be attached on the housing or sidewall within the charging station. A motor may be connected to a belt, gears, or other mechanism in the charging station to apply force to the platform and move it to a desired position.

Figure 5A:
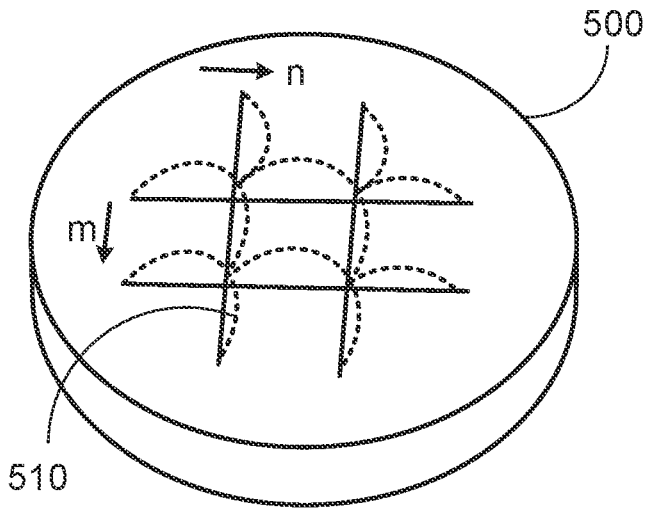
FIG. 5A is a perspective view of a portion of an example charging station that defines a grid that provides tracks or channels for travel of a transmitting coil platform.

FIG. 5A is a perspective view of a portion 500 of an example charging station that defines a track 510 (e.g., grooves, channels, or other features) for guiding travel of a transmitting coil platform 520. The portion 500 represents a bottom portion of the charging station, and the movable transmitting coil platform can be placed on and move along the bottom portion. The charging station may move the transmitting coil platform 520 on a 2-dimensional track 510 to adjust the position of the transmitting coil into alignment with the receiving coil of an electrical device to be charged. The example of FIG. 5A shows a track 510 arranged as a n×m grid and formed on the bottom case of the charging station. The track 510 in this instance is formed of two sets of parallel grooves or openings defined in a surface. The track 510 can admit projections at least partially into the track 510. The track 510 can include deeper regions at the end of a groove and the intersections of linear grooves where projections can rest in a stable or maintained position.

Underneath the surface that defines the track 510, the charging station can include motors and other mechanisms to engage the projections that extend into the track 510. For example, belts, gears, wheels, or other elements can engage projections to move the projections along the track 510. For example, the movement mechanism can push protrusions up out of an opening representing a stable position and then move the protrusions one grid-step along the track 510. This technique can be used to move the platform 520 incrementally in discrete steps left or right and up or down along the track 510. This is shown by the dotted lines in FIG. 5A that represent possible movement paths of the platform 520 between different positions. Of course, there is no requirement for discrete movement of the platform 520 to predetermined locations, and the mechanism can be configured to cause the platform 520 to come to rest at positions between the intersections of grooves in the grid.

Figure 5B:
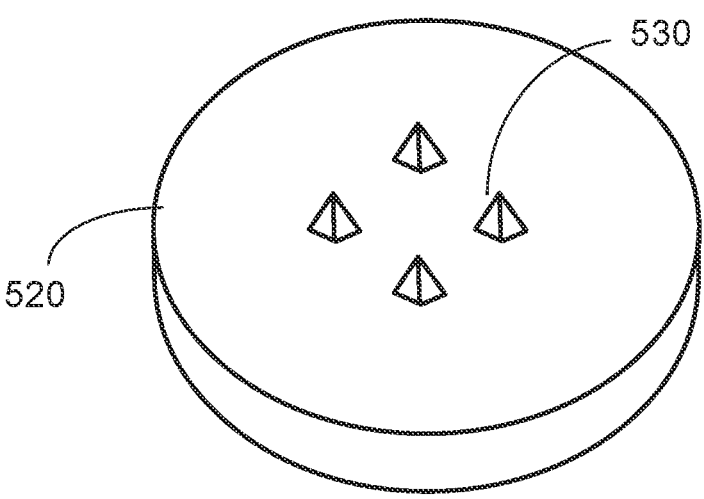
FIG. 5B is a perspective view of the underside of an example transmitting coil platform configured to interact with the grid of tracks or channels of FIG. 5A.

FIG. 5B is a perspective view of the underside of an example transmitting coil platform 520 configured to interact with the grid of tracks or channels of FIG. 5A. The transmitting coil platform 520 has multiple projections 530 that fit into the grooves or channels of the track 510. Elements of the charging station beneath the track 510 engage the protrusions and apply a force to them to move the transmitting coil platform 520 along the track. In this example, the transmitting coil platform 520 has four square-pyramid-shaped projections 530 located on a bottom surface 522 that is configured to face toward the upper surface 502 of the portion 500 of the charging station. At least a portion of each projection 530 can extend down into the track 510 and engage a movable element beneath which impels the platform 500 along the track 510.

Figures 6A, 6B:
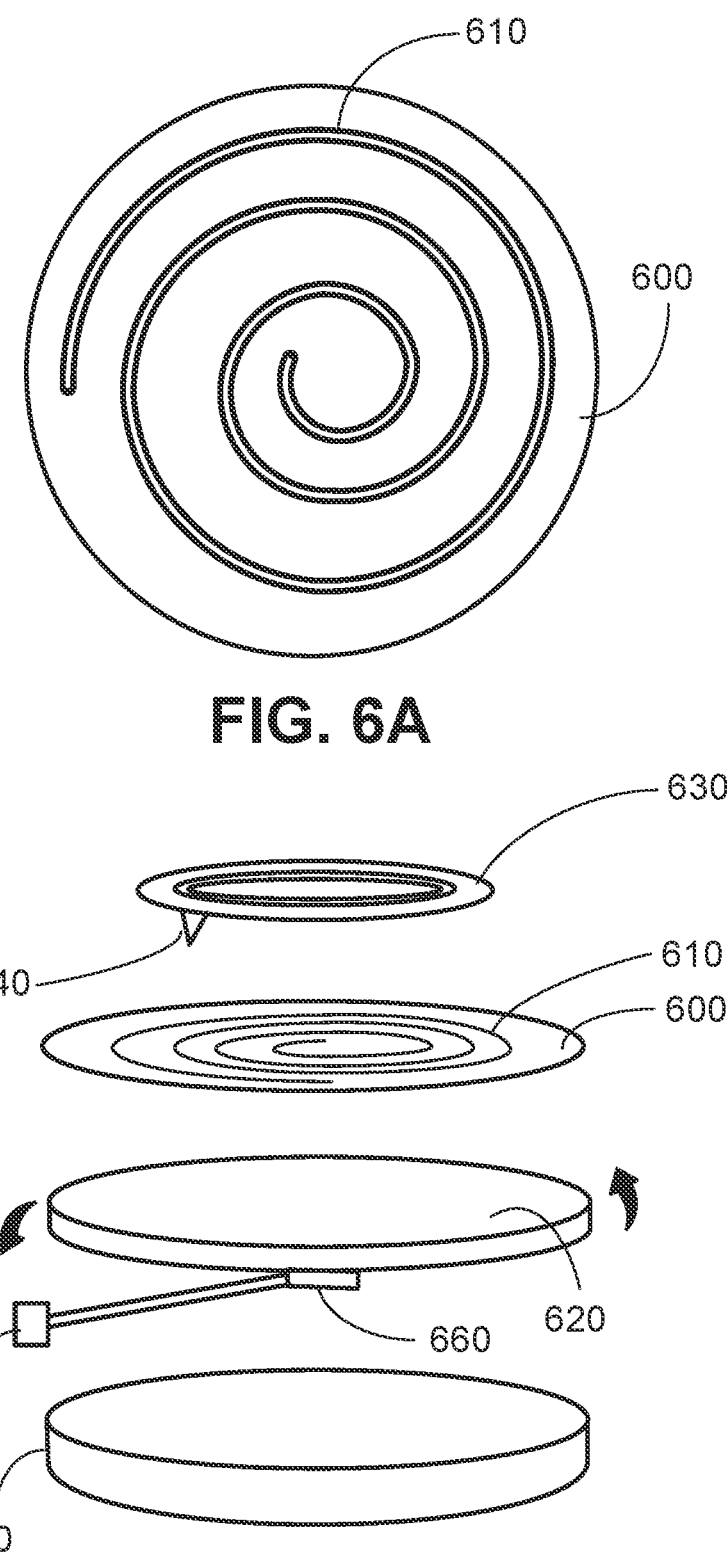
FIG. 6A is a top view of a portion of a charging station that defines a spiral track for travel of a transmitting coil platform.
FIG. 6B is an exploded view of portions of an example charging station that includes a transmitting coil platform configured to move along the spiral track of FIG. 6A.

FIGS. 6A and 6B illustrate an alternative method of moving a transmitting coil platform 630 carrying a wireless power transmitting coil in a charging station. FIG. 6A is a top view of a portion 600 of a charging station that defines a spiral track 610 that guides travel of the transmitting coil platform 630. The portion 600 can be a track plate or other element that defines the track 610 within the charging station, with the track 610 admitting a projection 640 from the transmitting coil platform 630 through the track 610 to engage with a rotating plate 620 below.

FIG. 6B is an exploded view of portions of an example charging station that includes the transmitting coil platform 630 configured to move along the spiral track 610 of FIG. 6A. FIG. 6B shows, from top to bottom, a transmitting coil platform 630, a track plate 600 defining the spiral track 610, and a rotating plate 620. In the assembled charging station, these elements are placed over a bottom portion 670 of a housing of the charging station. The transmitting coil platform 630 has a single projection 640 that extends from the bottom of the transmitting coil platform 630. When assembled, the projection 640 extends into the spiral track 610 of the spiral track plate 600. A motor 660 coupled to the housing of the charging station and is configured to rotate the rotating plate 620 in either direction, as instructed by control circuitry 650. By controlling the direction of rotation and amount of rotation of the rotating plate 620, the movement of the projection 640 along the track 610 can be set, which in turn causes the platform 630 to move the transmitting coil platform 630 to any of various locations within the charging station.

In some implementations, the track plate 600 is arranged to be attached to and to rotate with the rotating plate 620. In this case, the rotation of the platform 630 may be restrained, and rotation of the rotating plate 620 and track 610 (while the projection 640 is within the spiral track 610) can translate the platform 630 to different positions within the charging station. In other words, as the track 610 moves with the projection 640 within it, the moving track 610 would cause the platform 630 to move in a generally spiral pattern within the charging station.

In some implementations, the track plate 600 is attached in a stationary position within the charging station, slightly above the rotating plate 620, and the track plate 600 does not rotate with the rotating plate 620. In this case, the engagement of the projection 640 with the rotating plate 620, as the projection 640 extends through the spiral track 610, causes the projection 640 to move through the spiral track 610 and consequently for the rest of the platform 630 to move as well. Consequently, as the projection 640 is moved in the spiral pattern the rest of the platform 630 is also moved within the charging station.

Figure 6C:
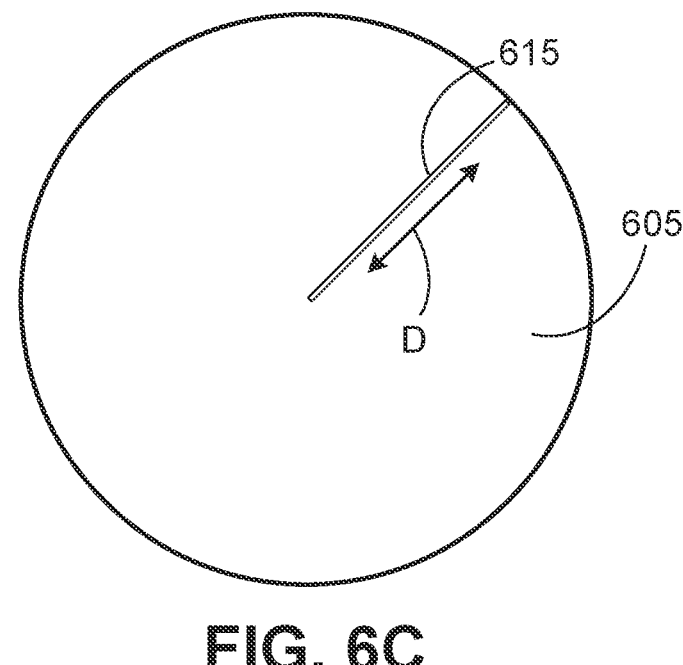
FIG. 6C is a top view of a portion of a charging station that defines a radial track for movement of a transmitting coil platform.
Figure 6D:
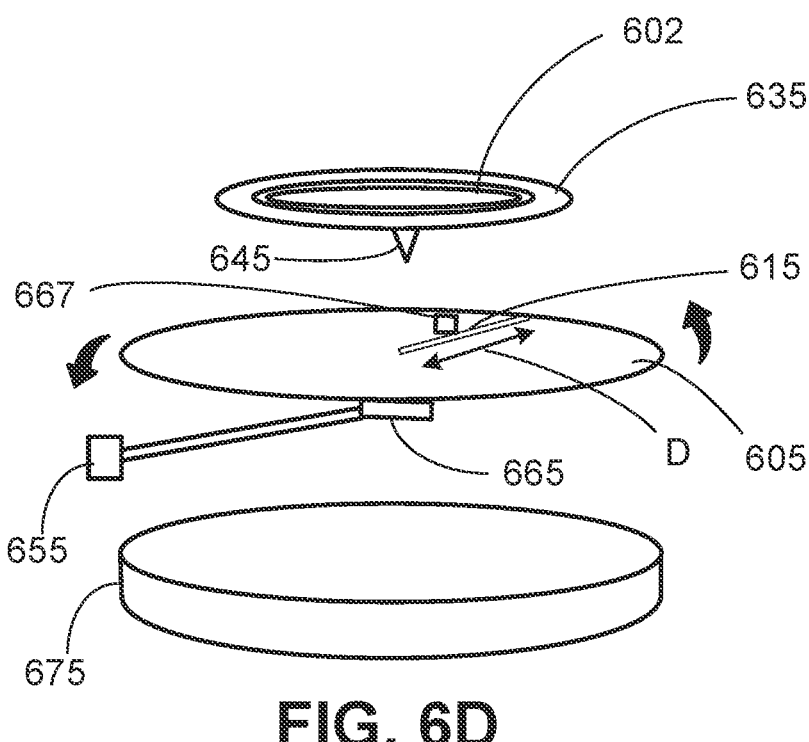
FIG. 6D is an exploded view of portions of an example charging station that includes a transmitting coil platform configured to move along the track of FIG. 6C.

FIGS. 6C and 6D illustrate another example of moving a transmitting coil platform 635 that carries a wireless power transmitting coil 602 in a charging station. In this example, two mechanisms cooperate to allow placement of the platform 635 at any position along a charging surface of the wireless charger. A first mechanism 667 moves the platform 635 back and forth along a track 615, e.g., along direction D. A second mechanism 665 rotates the track 615, the first mechanism 667, and the platform 635 together, e.g., in a plane parallel to the charging surface that the device 110 to be charged is placed on. As shown, the track 615 can extend radially outward with respect to a center of rotation of the track 615. As a result, the first mechanism 667 can set a radial position of the wireless power transmitting coil 602 by moving it to a desired radius distance along the track 615, and the second mechanism 665 can sweep the power transmitting coil 602 in a circle to a desired angular position.

FIG. 6C is a top view of a portion 605 of the charging station that defines a radial track 615 that guides the transmitting coil platform 635 to travel with respect to the track plate 605. In this example, the track plate 605 defines the track 615 that admits a projection 645 of the transmitting coil platform 635. In this example, the track 615 is a linear segment that extends radially, e.g., in a direction outward from a center of rotation of the track plate 605. The specific version shown has the track 615 starting from a center of the track plate 605 and ending at an edge of the track plate 605. Different lengths, shapes, and placements of tracks can also be used. The shape and size of the track 615 will naturally vary depending on the size of the platform 635 and the location of that the platform 635 couples to the track 615.

For example, given the size of the platform 630, the track 615 need not extend entirely to the center of rotation or to the perimeter of the interior space, because half of the platform 635 illustrated will extend beyond the central point on the platform 635 engages the track 615. As another example, the track 615 may extend in a direction different from a radial direction, as long as the track 615 includes positions along appropriate range of radius distances. Similarly, the track 615 need not be exactly linear and may be curved in some implementations.

FIG. 6D is an exploded view of portions of an example charging station that includes the transmitting coil platform 635 configured to move back and forth along the track 615 shown in FIG. 6C. FIG. 6D shows, from top to bottom, the transmitting coil platform 635 that carries the transmitting coil 602, the track plate 605 defining the radial track 615, and other components. In the assembled charging station, the elements are located over a bottom portion 675 of a housing of the charging station. As described earlier, the transmitting coil platform 635 has a projection 645 or other feature that is used to align the platform 635 with the track 615 and/or couple the platform to the first mechanism 667. The projection 645 can extend from the bottom of the transmitting coil platform 635. For example, the projection 645 extends into the track 615 of the track plate 605 when the charging station is assembled. Below the track plate 605 a motor or other mechanism 665 is coupled to the housing of the charging station and is configured to rotate the track plate 605 relative to the housing, as instructed by control circuitry 655. By controlling the rotational position of the track plate 605, the angular position of the track 615 and the platform 635 can be set. As discussed above, the translational movement of the platform 635 along the track 615 due to mechanism 667 sets the radial position of the transmitting coil 602. The rotational movement of the track plate 605, along with the mechanism 667 and platform 635, sets the angular position of the transmitting coil. Together, rotational movement and the translational movement along the track 615 allow the platform 635, and thus the transmitting coil 602 to be located at any of various locations within charging station.

In some implementations, the mechanisms 667, 665 provide controlled movement in ranges sufficient to allow placement of the transmitting coil 602 to provide power to a receiving coil placed at any position along an area of the charging station, e.g., at any portion of a charging surface or area designated for placement of a device to be charged. In other words, by moving outward along the radius or by sweeping the track, the charger can charge at any area within the circle formed by the largest radius the platform 635 can move to. In some implementations, the mechanism 665 permits a range of rotation that includes the majority or all of a full rotation (e.g., 270°, 315°, 360°, or more). For example, the rotation can be sufficient that the platform 635, when at the greatest radius allowed by the track 615, can at least sweep through enough of an arc that the area of the transmitting coil 602 at the beginning of the arc and the area of the transmitting coil 602 at the end of the arc at least partially overlap. The mechanism 665 can include an element to enable angular position to be set, e.g., a stepper motor, a servo motor, an encoder, a sensor-based control mechanism (e.g., allowing feedback control of rotational position), etc. To facilitate positioning, the mechanism 665 can include a motor that allows bidirectional rotation, or may include gears or another coupling that can reverse the direction of rotation.

The mechanism 667 can be coupled to the track plate 605, for example, attached above or below the track plate 605 or integrated on or within the track plate 605. The mechanism 667 can include a linear actuator. For example, the mechanism 667 can include belt drive or similar assembly, in which a motor rotates a wheel or gear that moves a cable, rack, chain, or belt to produce linear motion. As another example, a screw drive can be used, e.g., a leadscrew, screw jack, ball screw, or roller screw. The actuator can be configured so that a threaded element like a nut rotates to move the screw shaft linearly, or so that rotation of a screw shaft linearly moves a threaded element. As another example, a cam actuator can rotate a wheel-like cam rotates, with the eccentric shape of the cam engaging the base of a shaft to provide linear movement. Other actuators may also be used for the mechanism 667, such as a piezoelectric actuator, a solenoid actuator, a linear voice coil motor, a direct drive linear motor, etc.

Implementations of the techniques of FIGS. 6A-6D can use elements having different shapes than those illustrated. For example, a rotating element other than a circular plate 620, 625 can be used. For example, an extension or arm having an end coupled to the motor 660, 665 can be rotated in a plane below the charging surface, without requiring a full disc to be rotated. Similarly, in FIGS. 6C-6D, a thin extension or arm can be used to define the track 615, without requiring the larger track plate 605 illustrated. The track 615 may be defined in other ways than a groove or channel, for example, with a rail or guide rod, a wire, a ridge, or other features for directing the path of movement.

Figure 7:
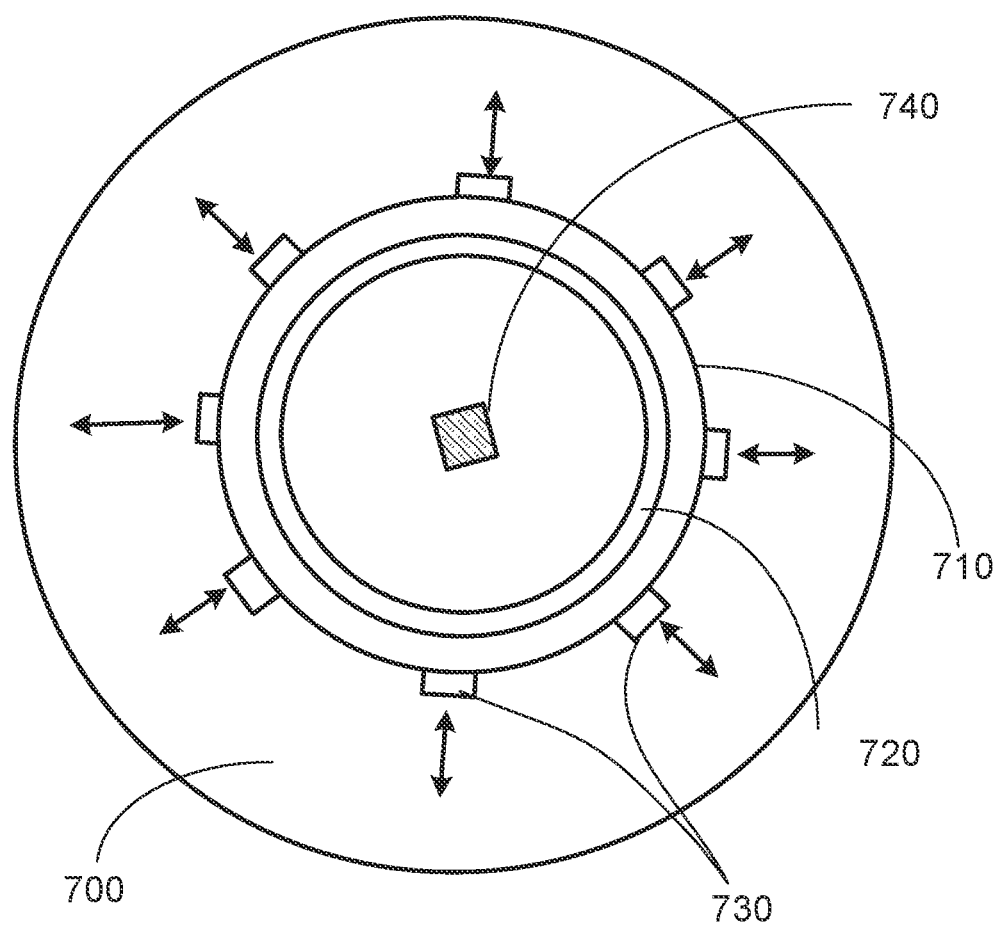
FIG. 7 is a top view of another example charging station with a permanent magnet included in a movable platform including a wireless power transmitting coil.

FIG. 7 is a top view of another example charging station 700 having a permanent magnet 740 included in a movable platform 710 including a wireless power transmitting coil 720. This version can have the platform 710 freely movable within the charging station 700 instead of having a mechanism for powering movement of the platform 710. The permanent magnet 740 is configured to attract to a corresponding permanent magnet in a device to be charged. As the device to be charged is placed on the charging station 700, the magnet in the device to be charged attracts the magnet 740 in the platform 710. The platform 710 automatically moves into alignment with the magnet in the device due to the force of magnetic attraction. A low-friction interface between the platform 710 and the surface 702 below allows the platform 710 to slide, roll, or otherwise move into position easily.

In the example, the charging station 700 comprises a transmitting coil platform 710 that can move omnidirectionally within the charging station 700 as it is attracted by the magnet in a device to be charged. A transmitting coil 720 is disposed on the top surface of the transmitting coil platform 710, and a permanent magnet 740 is located at the center of the transmitting coil 720. The transmitting coil platform 710 also includes a plurality of rotatable elements 730 (e.g., wheels, rollers, bearing balls, etc.) that attached at the bottom of the transmitting coil platform 710 to facilitate the movement of the platform 710 along the surface 702.

In this example, the permanent magnet 740 is configured to align the transmitting coil to a position that is aligned to a receiving coil of an electrical device for effective wireless charging. Permanent magnets with opposite poles facing each other are disposed at the center of the receiving coil and transmitting coils, respectively. The attractive force of the permanent magnets will draw the transmitting coil 720 into alignment with the receiving coil when the permanent magnets are initially placed closely enough to allow sufficient attractive force.

When the electrical device is placed on the charging station 700, the transmitting coil 720 will be automatically aligned with the receiving coil of the electrical device as the permanent magnets align. The rotatable elements 730 rotate freely and allow omnidirectional movement of the transmitting coil platform within the housing of the charging station 700. In this configuration, the charging station 700 does not employ any motors or active elements to drive the movement of the transmitting coil platform 710.

Figure 8:
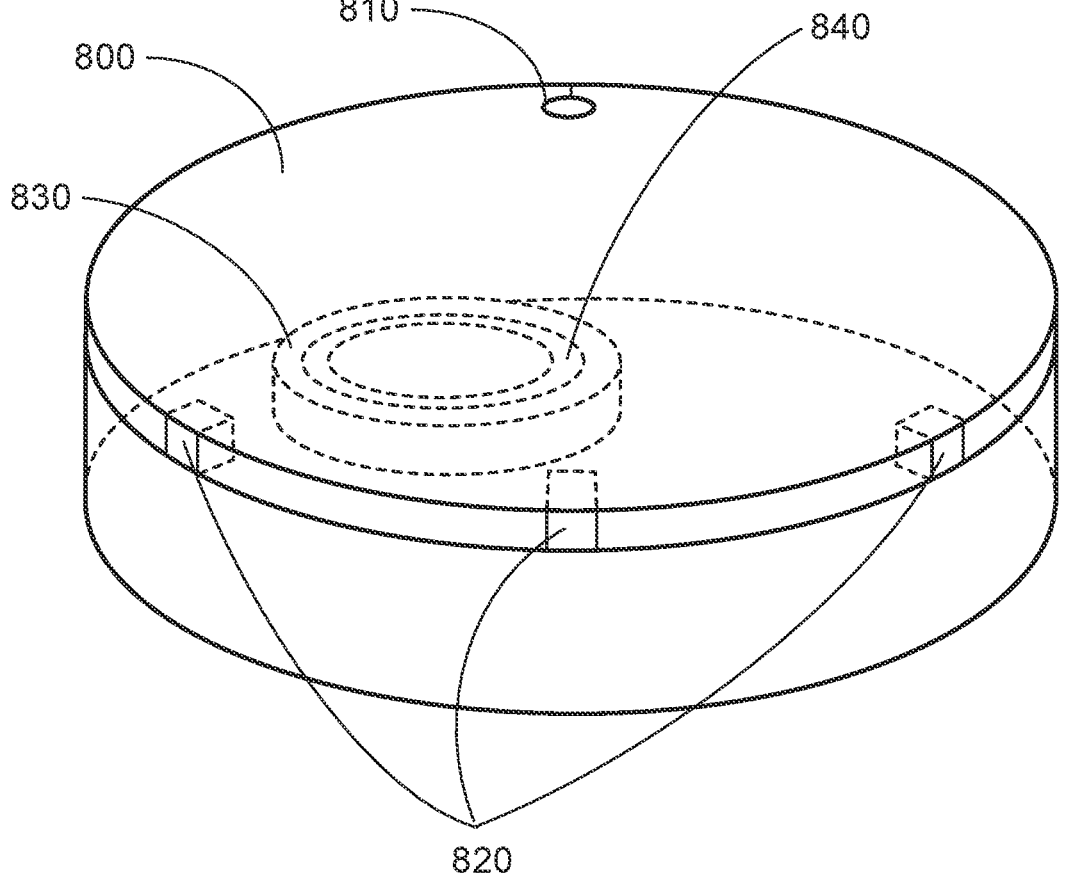
FIG. 8 is a perspective view of an example charging station having sensors or other elements for detecting the presence and/or location of devices to be charged.

FIG. 8 is a perspective view of an example charging station 800 having sensors 810, 820 or other elements for detecting the presence and/or location of devices to be charged. The charging station 800 can include multiple pressure sensors 820 embedded in the charging station 800 and/or an optical sensor 810 (e.g., a camera, a photodiode, etc.) arranged to detect an object on or above the charging station 800.

In some implementations, one or more optical sensors 810 are configured to detect the presence of and/or location of a device to be charged. A camera may be used to capture images that may show a device on or approaching the charging station. For example, a camera may be used at a low sampling rate to detect when a user is approaching the charging station and when a device is placed on the charging station. The camera may be positioned to capture images as viewed outward from a top surface of the charger (e.g., a charging surface on which devices are placed). As another example, the camera may be positioned to include the top surface of the charger in the field of view, allowing the image data to indicate the location of a device with respect to the charging station 800.

Another way that optical sensors can be used to determine device position is to use an array or grid of sensors, e.g., proximity sensors such as infrared sensors or photodiodes, along the top surface of the charging station 800. The sensors that detect an object nearby, e.g., due to being covered by a device to be charged, can indicate the area where the device is located. A processor of the charging station 800 can use the set of sensors that are currently covered or otherwise detect a proximate object on the charging surface to estimate a location, orientation, and size of the device to be charged.

In some other implementations, pressure sensors 820 or force sensors are arranged to be able to detect the presence of the electrical device on the charging station 800 and/or the location of the charging station. The sensors 820 generate output signals that are indicative of force applied on the charging station 800 by the device to be charged. When the detected force increases, then the wireless charging station 800 may determine that a device may have been placed on the charging station 800. Pressure sensors 820 can be distributed around a perimeter of the charging station 800, for example, between a portion comprising the top surface and a lower portion of the charging station 800. Using the differences in force measured by the different sensors, a processor of the wireless charging station 800 can estimate where the device to be charged is located, e.g., which quadrant, sector, or other region of the top surface the device has been placed on. For example, the device can be estimated to be nearest to the pressure sensor that detects the highest force. As another example, differences between the outputs of pairs or groups of sensors can be used to calculate a region where the device is located.

Figure 9:
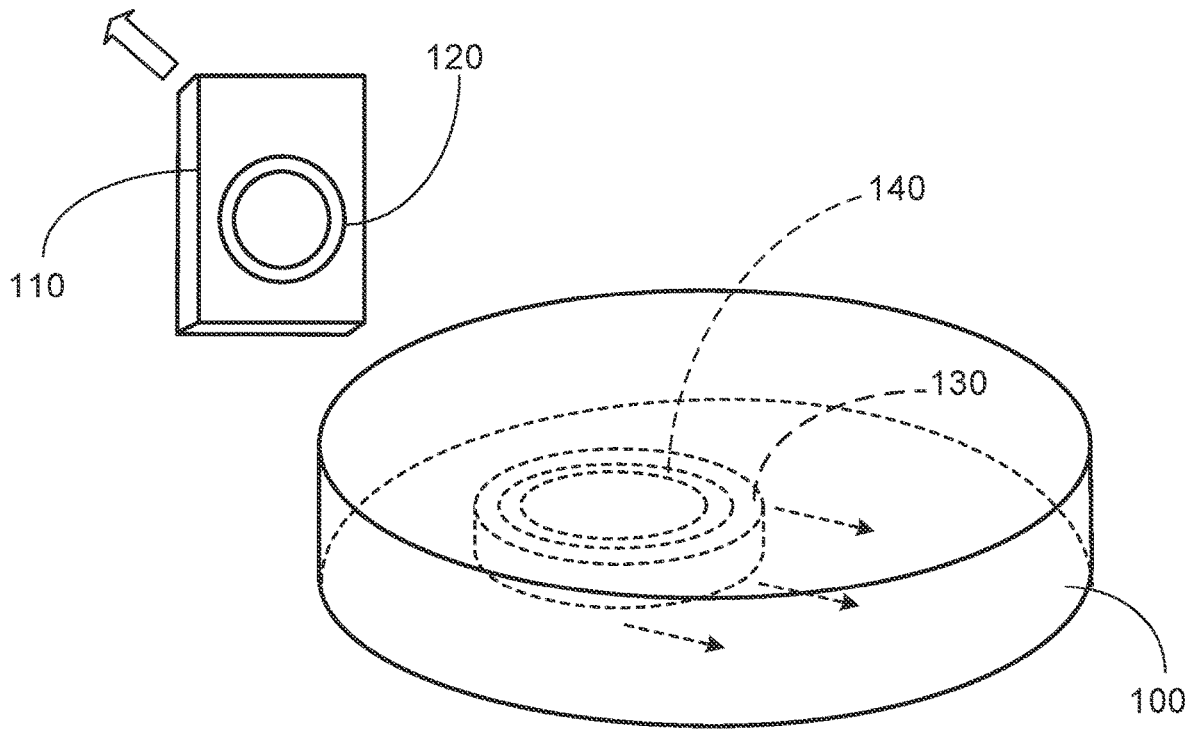
FIG. 9 is a perspective view of the charging station of FIG. 1A indicating operations in response to removal of the electrical device from the charging station.

FIG. 9 is a perspective view of the charging station of FIG. 1 indicating operations in response to removal of the electrical device 110 from the charging station 100. As described earlier, the charging station 100 is configured to move the transmitting coil platform 130 and align the transmitting coil 140 to the position of the receiving coil 120 in order to improve the efficiency of wireless charging. Once the charging is complete, or if the device 110 is removed from the charging station 100, wireless charging stops. The charging station 100 detects the end of charging, for example, from data from sensors or from other information, such as an instruction from the device to terminate charging, a loss of communication with the device being charged, etc. Based on detecting that the device 110 is removed or that charging is otherwise complete, the charging station 100 can automatically move the transmitting coil platform 130 back to a predetermined position, e.g., a standard or default position such as the center of the charging station 100. In some implementations, the transmitting coil platform 130 moves from a charging position (e.g., where the platform 130 was located for charging) to the predetermined position in a direct or straight path. In some other implementations, the transmitting coil platform 140 moves in reverse along a previous path of movement (e.g., a track) back to the predetermined position in the charging station 100. This movement can place the transmitting coil 140 in a position that is preferred for detecting and communicating with devices that may be placed on the charging station 100.

Any of the charging stations illustrated in the figures or discussed herein can include flexible conductors to connect the movable transmitting coil platform with drive circuitry and/or a power source that does not move with the platform. Similarly, any of the charging stations illustrated in the figures and described herein can include sensors (e.g., optical sensors, pressure sensors, etc.) to detect the presence of a device to be charged and to detect the location of a device on a charging station. In addition, or as an alternative, the wireless power transmitting coil of any of the charging stations discussed herein can be used to determine locations of devices and directions to move the wireless transmitting coil. For example, through communication with the device to be charged, the wireless charger can receive information about power received by the device, and from that information the wireless charger can determine the power transfer efficiency at the current location of the transmitting coil. By testing the efficiency at different locations of the transmitting coil, the wireless charger can identify which locations are closer to the receiving coil and thus provide higher efficiency.

Any of the charging stations that provide active movement of the transmission coil platform (e.g., all except charging station 700 of FIG. 7, which relies on a passive response to a nearby magnet) can include the general functional capabilities discussed for the charging station 100 of FIG. 1A. The primary difference among most of the examples of charging stations discussed is the mechanism for effecting the type of movement of the platform 130 as described in FIG. 1A. Any of the charging stations that actively move the transmission coil can thus be configured to perform the functional operations discussed above, such as detecting devices to be charged, locating the devices, assessing power transfer efficiency, determining a direction or location for moving the transmitting coil, generating control instructions or drive signals to cause movement toward alignment, and so on. The chargers can all include the corresponding hardware elements discussed above that may be used to provide those functions (e.g., control circuitry, processors, memory, communication elements, etc.).

FIG. 10 is a flow chart of a method 1000 for wireless charging of an electrical device on a charging station. The electrical device includes a receiving coil for receiving power. The charging station includes a transmitting coil located on a transmitting coil platform that is moveable within the internal space of the charging station. The method 1000 can be performed by one or more processors or other circuitry of any of the charging stations discussed above that are configured to actively move a transmitting coil platform (e.g., all but the charging station 700 of FIG. 7).

In method 1000, the charging station detects an electrical device placed on the charging station (1002). The charging station can include any of a plurality of techniques to detect the electrical device. For example, the charging station can use radio-frequency signals to determine the location of the electrical device (see FIGS. 1A-1C and corresponding description). The charging station can include multiple antenna elements that receive transmissions from the device to be charged. The multiple antenna elements can be arranged in an array with a known arrangement and distance between them, so the wireless charger can calculate a phase difference between the reception by the different antennas. The transmissions may be, for example, transmissions sent using BLUETOOTH, Wi-Fi, or ultra-wideband (UWB). The wireless charger can then use the phase difference(s) between the signals received by the different antenna elements to determine an angle of incidence of signals from the device to be charged, then use the angle of incidence to determine the direction and/or location of the device as discussed able. As another example, the charging station can be configured to process image or video information captured by a camera located at the top surface of the charging station. By analyzing the captured image or video, the charging station determines a position of the electrical device on the charging station. In another example, the charging station detects the electrical device by processing output signals of one or more sensors embedded in the charging station. The one or more sensors may be pressure sensors that sense the weight of the electrical device and provide various output signals according to the locations of the electrical device on the charging station.

Upon detecting the electrical device placed on the charging station, the charging station determines whether the receiving coil of the electrical device is aligned with the transmitting coil of the charging station (1004). For example, the charging station may analyze the electrical device profile shown in the image or video captured by the camera, and match the profile to one of the stored devices information. Once the electrical device is identified, the charging station then identifies a position of the receiving coil in the electrical device. A determination of whether the receiving coil is aligned with the transmitting coil is made based on comparing the axes positions of the transmitting and receiving coils. The receiving coil and transmitting coils are misaligned when the distance of the axes of the receiving and transmitting coils are equal to or larger than a preset value.

In method 1000, the charging station determines a charging position for the transmitting coil to move to within the internal space of the charging station (1006). If the transmitting and receiving coils are determined to be aligned by the charging station, then the charging station determines that a current position of the transmitting coil is the charging position and no need to move the transmitting coil. On the other hand, if the transmitting and receiving coils are determined to be misaligned, the charging station then sets the vertically projected position from the center of the receiving coil on the bottom case of the charging station to be the charging position. In some implementations, the charging station may determine a charging position that is close to the vertically projected position and that the transmitting coil is moveable to within the charging station.

Based on the determined charging position of the transmitting coil, the charging station then moves the transmitting coil platform to the charging position to align the transmitting and receiving coils (1008). For example, the charging station may include an electromagnets grid on its bottom case and is configured to control the switch of the electromagnets in the grid. The charging station may sequentially switch on electromagnets from the edge of the grid to the charging position, and drive the transmitting coil platform to move to the charging position through the magnetic force between the electromagnet and a permanent magnet located on the transmitting coil platform. In another example, the charging station may include a motor that is attached on the transmitting coil platform or on the housing of the charging station. The motor may receive power and control signals from the charging station and drive the rotation of rotatable elements (e.g., rollers, wheels, etc.) located at the bottom of the transmitting coil platform. The motor may be configured to drive each of the rollers separately or together and may move the transmitting coil platform in any direction in a horizontal plane in the charging station. In another example, the charging station may include a permanent magnet located at the center of the transmitting coil. The permanent magnet is attracted by another permanent magnet located in the electrical device with opposite pole. According to the position of the electrical device placed on the charging station, the transmitting coil platform is driven by the magnetic force generated between the permanent magnets and moved to the charging position where the transmitting and receiving coils are aligned.

In method 1000, the charging station determines whether the charging is completed or the electrical device is removed from the charging station (1010). For example, the charging station may communicate with the electrical device regarding the charging levels via a wireless link such as Bluetooth, ultra-wideband (UWB) NFC, or Wi-Fi, or through communication over the power transfer interface between the power transmitting coil and the power receiving coil. Once the battery of the electrical device is full or reaches a preset level, the electrical device may convert the status from charging to non-charging. The electrical device may share the non-charging status with the charging station via the wireless link. Based on the shared non-charging status of the electrical device, the charging station determines the wireless charging is completed. In another example, the electrical device is removed from the charging station. One or more detecting apparatuses of the charging station may detect the removal of the electrical device by analyzing changes in the updated image, video or sensing information.

According to the determination that the wireless charging is completed or the electrical device is removed from the charging station, the charging station moves the transmitting coil platform back to the center of the charging station (1012). For example, the charging station may sequentially switch the electromagnets in the grid aligned on its bottom case, from the charging position to the center of the charging station, and drive the movement of the transmitting coil platform through the magnetic force between the electromagnets and the permanent magnet located at the center of the transmitting coil. In another example, the charging station may calculate a path from the charging position to the center of the charging station, and generate control signals that correspond to the calculated path. The control signals may be delivered to a motor located on the transmitting coil platform or the housing of the charging station. The motor then drives the rotation of rollers attached at bottom edges of the transmitting coil platform, to move the transmitting coil to the center of the charging station.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in electronic circuitry, or in computer software, firmware, and/or hardware, including the structures disclosed in this specification and their structural equivalents, or in combinations of one or more of them. A circuit board can be implemented as a mixed-signal chip (e.g., a CMOS integrated circuit) that includes analog, digital, and mixed-signal circuits, as well as potentially firmware or embedded software. For example, operations of the control circuitry may be implemented using digital circuitry, an FPGA (field programmable gate array) or other programmable logic device, a processor and corresponding software, and so on.

Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one device or on multiple devices that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method comprising:
   detecting, by a wireless charger, a device to be charged, wherein the wireless charger comprises a housing and a wireless power transmission coil that is movable within the housing;
   receiving, with multiple antenna elements of the wireless charger, multiple incoming radio frequency communications from the device to be charged;
   calculating, by the wireless charger, an angle of incidence for each of the multiple incoming radio frequency communications from the device to be charged;
   determining, by the wireless charger, that a position of the device to be charged has stabilized based on the calculated angles of incident from the device to be charged;
   determining, by the wireless charger, a direction to move the wireless power transmission coil within the housing to improve alignment of the wireless power transmission coil with a wireless power receiving coil of the device to be charged, wherein determining the direction to move the wireless power transmission coil is based on an angle of incidence corresponding to the stabilized position of the device to be charged; and
   moving, by the wireless charger, the wireless power transmission coil within the housing in the determined direction to align the wireless power transmission coil with the wireless power receiving coil of the device to be charged.

2. The method of claim 1, wherein determining the direction to move the wireless power transmission coil comprises communicating with the device to determine a wireless coupling strength at each of multiple positions of the power transmitting coil.

3. The method of claim 1, wherein determining the direction to move the wireless power transmission coil comprises:
   estimating, by the wireless charger, a position at which the device to be charged is located on a surface of the wireless charger; and
   determining the direction based on the estimated position.

4. The method of claim 1,
   wherein the method comprises determining a signal strength with which the multiple antennas detected a wireless communication from the device to be charged; and
   wherein determining the direction to move the wireless power transmission coil comprises determining the direction based on differences between signal strengths with which the multiple antennas detected the wireless communication from the device to be charged.

5. The method of claim 1, comprising automatically moving the wireless power transmission coil to a predetermined position within the housing in response to at least one of (i) detecting the device to be charged or (ii) terminating charging of the device to be charged.

6. The method of claim 5, wherein the predetermined position is a position at a center of a charging surface of the wireless charger.

7. The method of claim 1, comprising performing foreign object detection by requiring verification, by the wireless charger, that the device is appropriate to be charged before supplying power above a threshold level, wherein the verification is based on data communication between the device and the wireless charger.

8. The method of claim 7, wherein performing foreign object detection comprises requiring the device to acknowledge that at least a minimum amount of transmitted power is being received by the charged device.

9. The method of claim 1, comprising determining a phase difference between signals generated by the multiple antenna elements based on a radio frequency communication of the multiple incoming radio frequency communications, wherein the angle of incidence corresponding to the stabilized position of the device to be charged is determined based on the phase difference.

10. The method of claim 1, wherein the radio frequency communications are Bluetooth transmissions, Wi-Fi transmissions, or ultra-wideband transmissions.

11. The method of claim 1, wherein moving the wireless power transmission coil within the housing to align the wireless power transmission coil with the wireless power receiving coil comprises: (1) initially moving the wireless power transmission coil based on the direction which is determined based on the angle of incidence corresponding to the stabilized position of the device, and thereafter (2) using measures of inductive coupling between the wireless power transmission coil and the wireless power receiving coil to move the wireless power transmission coil until a measure of inductive coupling satisfies a threshold indicating that the wireless power transmission coil and the wireless power receiving coil are in alignment.

12. One or more non-transitory machine-readable media storing instructions that, when executed by one or more processors of a wireless charger, cause the wireless charger to perform operations, including:

detecting, by the wireless charger, a device to be charged, wherein the wireless charger comprises a housing and a wireless power transmission coil that is movable within the housing;

receiving, with multiple antenna elements of the wireless charger, multiple incoming radio frequency communications from the device to be charged;

calculating, by the wireless charger, an angle of incidence for each of the multiple incoming radio frequency communications from the device to be charged;

determining, by the wireless charger, that a position of the device to be charged has stabilized based on the calculated angles of incident from the device to be charged;

determining, by the wireless charger, a direction to move the wireless power transmission coil within the housing to improve alignment of the wireless power transmission coil with a wireless power receiving coil of the device to be charged, wherein determining the direction to move the wireless power transmission coil is based on an angle of incidence corresponding to the stabilized position of the device to be charged; and moving, by the wireless charger, the wireless power transmission coil within the housing in the determined direction to align the wireless power transmission coil with the wireless power receiving coil of the device to be charged.

13. A wireless charger comprising:

a housing that includes an exterior surface to receive a device to be charged, the housing defining an internal space;

a movable assembly configured to move within the internal space of the housing, the movable assembly including a wireless power transmission coil;

one or more actuators configured to move the movable assembly;

multiple antenna elements for receiving radio frequency communications; and a control unit configured to:

detect the device to be charged;

receive, with the multiple antenna elements, multiple incoming radio frequency communications from the device to be charged;

calculate an angle of incidence for each of the multiple incoming radio frequency communications from the device to be charged;

determine that a position of the device to be charged has stabilized based on the calculated angles of incident from the device to be charged;

determine a direction to move the movable assembly within the housing to improve alignment of the wireless power transmission coil with a wireless power receiving coil of the device to be charged, wherein determining the direction to move the wireless power transmission coil is based on an angle of incidence corresponding to the stabilized position of the device to be charged; and send one or more control signals to cause the one or more actuators to move the movable assembly in the direction determined by the control unit.

14. The wireless charger of claim 13, wherein the movable assembly is movable in a plane.

15. The wireless charger of claim 14, wherein the movable assembly is movable in any direction in the plane.

16. The wireless charger of claim 14, wherein the movable assembly is movable along each of two perpendicular axes in the plane.

17. The wireless charger of claim 13, wherein the one or more actuators comprise at least one of a motor, an electromagnet, a linear actuator, or a piezoelectric element.

18. The wireless charger of claim 13, wherein the one or more actuators comprise a motor mounted to the housing that is configured to move the movable assembly within the internal space.

19. The wireless charger of claim 13, wherein the one or more actuators comprise a motor mounted to the movable assembly that is configured to move the movable assembly within the internal space.

20. The wireless charger of claim 13, wherein the one or more actuators comprise electromagnets coupled to the housing of the wireless charger, the electromagnets being arranged to interact with the movable platform to impel movement of the movable platform within the internal space.

21. The wireless charger of claim 20, wherein the electromagnets comprise electromagnets arranged in a regular pattern, wherein the movable assembly comprises one or more magnetically responsive elements comprising at least one of a permanent magnet, an electromagnet, or a ferromagnetic element, wherein the movable assembly is located between the regular pattern of electromagnets and the exterior surface such that activation of the electromagnets can impel the movable assembly in each of multiple directions within the interior space.

22. The wireless charger of claim 20, wherein the control unit is configured to selectively activate different sets of the electromagnets to cause incremental changes in the position of the movable assembly within the internal space.

23. The wireless charger of claim 13, wherein the housing of the wireless charger defines a track or groove configured to guide a path of movement of the movable assembly within the interior space, and the one or more actuators are configured to move the movable assembly along the track or groove.

24. The wireless charger of claim 23, wherein the track has a spiral shape.

25. The wireless charger of claim 23, wherein the exterior surface has a central portion and an outer perimeter, wherein the track comprises a track segment that extends along a substantially linear path from the central portion toward the outer perimeter.

26. The wireless charger of claim 23, wherein the wireless charger includes a mechanism configured to (i) rotate the track and the movable assembly together or (ii) rotate in a manner that moves the movable assembly through the track without moving the track.

27. The wireless charger of claim 23, wherein the exterior surface is a substantially planar surface, wherein the wireless charger includes a rotating element that is configured to rotate within the housing in a plane substantially parallel to the exterior surface, wherein the track extends in a radial direction with respect to a center of rotation of the rotating element.

28. The wireless charger of claim 13, wherein the movable platform has an upper side and a lower side facing opposite the upper side, wherein the upper side faces toward the exterior surface, and wherein the movable assembly has rollers, wheels, or bearing balls arranged at the lower side to engage a bearing surface at the interior space and provide omnidirectional movement of the movable platform along the bearing surface.

29. The wireless charger of claim 13, wherein the movable assembly comprises a magnetic shielding component placed between the wireless power transmission coil and the one or more actuators, the wireless power transmission coil being located between the exterior surface and the one or more actuators.

30. The wireless charger of claim 13, wherein the control unit is configured to determine the angle of incidence corresponding to the stabilized position of the device to be charged based on a phase difference between signals received by the multiple antenna elements.

31. The wireless charger of claim 13, wherein the one or more control signals are configured to cause the movable assembly to move: (1) initially based on the direction which is determined based on the angle of incidence corresponding to the stabilized position of the device, and thereafter (2) using measures of inductive coupling between the wireless power transmission coil and the wireless power receiving coil to move the movable assembly until a measure of inductive coupling satisfies a threshold indicating that the wireless power transmission coil and the wireless power receiving coil are in alignment.

* * * * *